US012761450B2

(12) United States Patent
Li et al.

(10) Patent No.: US 12,761,450 B2
(45) Date of Patent: Oct. 13, 2026

(54) OPTICAL IMAGING LENS ASSEMBLY

(71) Applicant: Zhejiang Sunny Optics Co., Ltd, Yuyao City (CN)

(72) Inventors: Ruihong Li, Yuyao City (CN); Long Zhang, Yuyao City (CN); Huilong Li, Yuyao City (CN); Bian Zhang, Yuyao City (CN); Fang Zhang, Yuyao City (CN); Fujian Dai, Yuyao City (CN); Liefeng Zhao, Yuyao City (CN)

(73) Assignee: Zhejiang Sunny Optics Co., Ltd, Yuyao City (CN)

( * ) Notice: Subject to any disclaimer, the term of this patent is extended or adjusted under 35 U.S.C. 154(b) by 657 days.

(21) Appl. No.: 18/302,762

(22) Filed: Apr. 18, 2023

(65) Prior Publication Data

US 2023/0367102 A1 Nov. 16, 2023

(30) Foreign Application Priority Data

May 13, 2022 (CN) ......................... 202210523670.6

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ....... G02B 13/0045; G02B 9/64; G02B 7/021
See application file for complete search history.

(56) References Cited

U.S. PATENT DOCUMENTS

2017/0329108 A1 11/2017 Masaya
2019/0391365 A1* 12/2019 Son .......................... G02B 7/02
2020/0201002 A1 6/2020 Baio et al.
2021/0191080 A1 6/2021 Qingzhi et al.
(Continued)

FOREIGN PATENT DOCUMENTS

CN 109765679 A 5/2019
CN 209167644 U 7/2019
CN 110412749 A 11/2019
(Continued)

OTHER PUBLICATIONS

CN-111208617, translation. (Year: 2020).*
(Continued)

*Primary Examiner* — Wen Huang
(74) *Attorney, Agent, or Firm* — Reising Ethington P.C.

(57) ABSTRACT

The present disclosure discloses an optical imaging lens assembly including a lens barrel, and a lens group and at least seven spacing elements accommodated in the lens barrel. The lens group comprises first to eighth lenses arranged in sequence along an optical axis from an object side to an image side. Here, at least one lens in the first lens to the fourth lens is a meniscus lens, and a refractive power of the seventh lens and a refractive power of the eighth lens are positive-negative opposite. A distance from a center of an effective-diameter portion of an object-side surface of the eighth lens to a rear-end surface of the lens barrel along the optical axis is less than a distance from an edge of the effective-diameter portion of the object-side surface of the eighth lens to the rear-end surface of the lens barrel along the optical axis.

19 Claims, 13 Drawing Sheets

(56) References Cited

U.S. PATENT DOCUMENTS

| | | | | |
|---|---|---|---|---|
| 2022/0413266 | A1* | 12/2022 | Arita | G02B 13/06 |

FOREIGN PATENT DOCUMENTS

| | | | | | |
|---|---|---|---|---|---|
| CN | 110908084 | A | | 3/2020 | |
| CN | 111208617 | A | * | 5/2020 | G02B 7/021 |
| CN | 111474681 | A | | 7/2020 | |
| CN | 211669434 | U | | 10/2020 | |
| CN | 214375495 | U | | 10/2021 | |
| CN | 114047607 | A | | 2/2022 | |
| CN | 217213307 | U | | 8/2022 | |

OTHER PUBLICATIONS

Chinese Office Action corresponding to application 202310401165.9, dated Jul. 17, 2025, 12 pages.

Chinese Office Action corresponding to application 202210523670.6, dated Aug. 12, 2025, 10 pages.

Notification of Payment of Grant Fee with Search Report corresponding to application 202210523670.6, dated Sep. 3, 2025, 8 pages.

Machine translation of Chinese Office Action corresponding to application 202310406860.4, dated Dec. 10, 2025, 6 pages.

* cited by examiner

OPTICAL IMAGING LENS ASSEMBLY

CROSS-REFERENCE TO RELATED APPLICATION

This application claims priority to Chinese Patent Application No. 202210523670.6 filed on May 13, 2022 before the China National Intellectual Property Administration, the entire disclosure of which is incorporated herein by reference in its entity.

TECHNICAL FIELD

The present disclosure relates to the field of optical elements, and specifically to an optical imaging lens assembly.

BACKGROUND

With the development of science and technology, portable electronic products have developed rapidly. Especially, the mobile phones, tablet computers, etc. have become indispensable in modern life. The imaging devices mounted on the portable electronic products are being rapidly upgraded with the advancement of technologies, and the requirements on the quality of optical imaging lens assemblies are also getting higher and higher.

For high-end imaging lens assemblies with a large number of lenses, it is difficult to design and produce them, and they have common problems of being difficult to be miniaturized and ultra-thin. Moreover, most products are prone to a series of problems such as stray light, ghost images, low performance yield, poor assembling stability, low relative illumination, and poor reliability of the lens assemblies, affecting the imaging quality and structural stability of the lens assemblies.

Lens assemblies having a large image plane can accommodate more pixels while maintaining the pixel sizes unchanged. In order to realize objective needs, Ultra-thin camera lens assemblies having a large image plane need to be designed at present. Compared with common lens assemblies having a large image plane, such camera lens assemblies can have good processing feasibility, a good stray light status, good assembling stability, good reliability, etc., thereby achieving the ultra-thin characteristics of the lens assemblies, improving the imaging quality of the lens assemblies and improving the performance yield. Thus, the camera lens assemblies can well meet the application needs of the main cameras on the next generation of high-end smart phones.

Therefore, there is a need for further exploration and research on how to more reasonably realize the structural arrangements of the lens assemblies having a plurality of lenses, and how to realize the control and optimization for some key parameters of the lenses, spacing elements and other structures in the lens assembly, thereby enabling the lens assembles to have better structures, to improve the quality issues such as the reliability of the lens assemblies.

SUMMARY

The present disclosure provides an optical imaging lens assembly including: a lens barrel, and a lens group and at least seven spacing elements accommodated in the lens barrel. The lens group includes a first lens, a second lens, a third lens, a fourth lens, a fifth lens, a sixth lens, a seventh lens and an eighth lens that are arranged in sequence along an optical axis from an object side to an image side, where at least one lens in the first lens to the fourth lens is a meniscus lens, and a refractive power of the seventh lens and a refractive power of the eighth lens are positive-negative opposite; and a distance from a center of an effective-diameter portion of an object-side surface of the eighth lens to a rear-end surface of the lens barrel along the optical axis is less than a distance from an edge of the effective-diameter portion of the object-side surface of the eighth lens to the rear-end surface of the lens barrel along the optical axis; the at least seven spacing elements include a fifth spacing element that is disposed on an image side of the fifth lens and is partially in contact with the fifth lens, and at least one spacing element disposed between the seventh lens and the eighth lens. A radius of curvature R9 of an object-side surface of the fifth lens, a radius of curvature R10 of an image-side surface of the fifth lens, an inner diameter d5s of an object-side surface of the fifth spacing element, and an inner diameter d5m of an image-side surface of the fifth spacing element may satisfy: $(R9 \times R10)/(d5s \times d5m) > 0.5$.

In an implementation, the at least seven spacing elements include a first spacing element that is disposed on an image side of the first lens and is partially in contact with the first lens.

In an implementation, a radius of curvature R1 of an object-side surface of the first lens, a radius of curvature R2 of an image-side surface of the first lens, an inner diameter dis of an object-side surface of the first spacing element and an inner diameter d1m of an image-side surface of the first spacing element may satisfy: $(R1+R2)/(R2-R1) \times (d1s/d1m) > 1.0$.

In an implementation, the first lens has a positive refractive power, an object-side surface of the first lens is a convex surface, and an image-side surface of the first lens is a concave surface; and the second lens has a positive refractive power, and an object-side surface of the second lens is a convex surface.

In an implementation, the at least seven spacing elements include an i-th spacing element that is disposed on an image side of an i-th lens and is partially in contact with the i-th lens, and the optical imaging lens assembly may satisfy: $-100.0 < Rim/CTi + Dis/dis < 100.0$, where Rim is a radius of curvature of an image-side surface of the i-th lens, CTi is a center thickness of the i-th lens on the optical axis, Dis is an outer diameter of an object-side surface of the i-th spacing element, and dis is an inner diameter of the object-side surface of the i-th spacing element, where i is selected from 1, 2, 3 or 4.

In an implementation, the fifth lens has a negative refractive power, the object-side surface of the fifth lens is a convex surface, and the image-side surface of the fifth lens is a concave surface.

In an implementation, the seventh lens has a positive refractive power.

In an implementation, the eighth lens has a negative refractive power, and the object-side surface of the eighth lens is a concave surface.

In an implementation, the at least seven spacing elements include a j-th spacing element that is disposed on an image side of a j-th lens and is partially in contact with the j-th lens, and a (j−1)-th spacing element that is disposed on an image side of a (j−1)-th lens and is partially in contact with the (j−1)-th lens, and the optical imaging lens assembly may satisfy: $EP(j-1)/CPj + T(j-1)/CTj > 0.5$, where Ep(j−1) is a spacing distance between the (j−1)-th spacing element and the j-th spacing element along the optical axis, CPj is a maximal thickness of the j-th spacing element, T(j−1) is an air spacing between the (j−1)-th lens and the j-th lens on the optical axis, and CTj is a center thickness of the j-th lens on the optical axis, where j is selected from 5, 6 or 7.

In an implementation, the at least seven spacing elements include a j-th spacing element that is disposed on an image side of a j-th lens and is partially in contact with the j-th lens, and a (j−1)-th spacing element that is disposed on an image side of a (j−1)-th lens and is partially in contact with the (j−1)-th lens, and the optical imaging lens assembly may satisfy: $1.0<EP(j-1)/CPj+T(j-1)/CTj<20.0$, where Ep(j−1) is a spacing distance between the (j−1)-th spacing element and the j-th spacing element along the optical axis, CPj is a maximal thickness of the j-th spacing element, T(j−1) is an air spacing between the (j−1)-th lens and the j-th lens on the optical axis, and CTj is a center thickness of the j-th lens on the optical axis, where j is selected from 5, 6 or 7.

In an implementation, the at least one spacing element disposed between the seventh lens and the eighth lens includes: a seventh spacing element that is disposed on an image side of the seventh lens and is partially in contact with the seventh lens, and an eighth spacing element that is disposed on an image side of the seventh spacing element.

In an implementation, a radius of curvature R16 of an image-side surface of the eighth lens, a radius of curvature R15 of the object-side surface of the eighth lens, an effective focal length f8 of the eighth lens, an inner diameter d7bs of an object-side surface of the eighth spacing element and an inner diameter d7bm of an image-side surface of the eighth spacing element may satisfy: $(R16-R15)/f8\times(d7bs/d7bm)>15.0$.

In an implementation, a radius of curvature R16 of an image-side surface of the eighth lens, a radius of curvature R15 of the object-side surface of the eighth lens, an effective focal length f8 of the eighth lens, an inner diameter d7bs of an object-side surface of the eighth spacing element and an inner diameter d7bm of an image-side surface of the eighth spacing element may satisfy: $20.0<(R16-R15)/f8\times(d7bs/d7bm)<80.0$.

In an implementation, an outer diameter D6s of an object-side surface of a sixth spacing element that is disposed on an image side of the sixth lens and is partially in contact with an image-side surface of the sixth lens, an inner diameter d6s of the object-side surface of the sixth spacing element that is disposed on the image side of the sixth lens and is partially in contact with the image-side surface of the sixth lens, a spacing distance EP67 between the sixth spacing element that is disposed on the image side of the sixth lens and is partially in contact with the image-side surface of the sixth lens and the seventh spacing element that is disposed on the image side of the seventh lens and is partially in contact with an image-side surface of the seventh lens along the optical axis, an air spacing T67 between the sixth lens and the seventh lens on the optical axis and a center thickness CT6 of the sixth lens on the optical axis may satisfy: $(D6s+d6s)/EP67+167/016>20.0$.

In an implementation, a spacing distance EP12 between the first spacing element and a second spacing element that is disposed on an image side of the second lens and is partially in contact with an image-side surface of the second lens along the optical axis, a maximal thickness CP1 of the first spacing element, a center thickness CT1 of the first lens on the optical axis and an air spacing T12 between the first lens and the second lens on the optical axis may satisfy: $EP12/CP1+CT1/T12>10\ 0.0$.

In an implementation, an air spacing T56 between the fifth lens and the sixth lens on the optical axis, a center thickness CT6 of the sixth lens on the optical axis, a spacing distance EP56 between the fifth spacing element that is disposed on the image side of the fifth lens and is partially in contact with the image-side surface of the fifth lens and the sixth spacing element that is disposed on an image side of the sixth lens and is partially in contact with an image-side surface of the sixth lens along the optical axis, a maximal thickness CP6 of the sixth spacing element that is disposed on the image side of the sixth lens and is partially in contact with the image-side surface of the sixth lens, a radius of curvature R11 of an object-side surface of the sixth lens and an effective focal length f6 of the sixth lens may satisfy: $(T56+CT6)/(EP56+CP6)\times(R11/f6)<0$.

In an implementation, an inner diameter d0m of an end surface of the lens barrel closest to the image side, an outer diameter D0m of the end surface of the lens barrel closest to the image side, a distance L from an end surface closest to a photographed object to the end surface of the lens barrel closest to the image side, a distance TD from the object-side surface of the first lens to the image-side surface of the eighth lens along the optical axis and an effective focal length f of the optical imaging lens assembly may satisfy: $(d0m+D0m)/L+TD/f>2.0$.

In an implementation, the at least seven spacing elements include a flat-angle spacing element or a chamfer spacing element, and an inner hole of the chamfer spacing element has a chamfer within a range from 45° to 60° on an object-side surface or image-side surface of the chamfer spacing element.

BRIEF DESCRIPTION OF THE DRAWINGS

In combination with the accompanying drawings, other features, objectives and advantages of the present disclosure will become more apparent through the following detailed description for non-limiting embodiments. In the accompanying drawings.

DETAILED DESCRIPTION OF EMBODIMENTS

Figure 1:
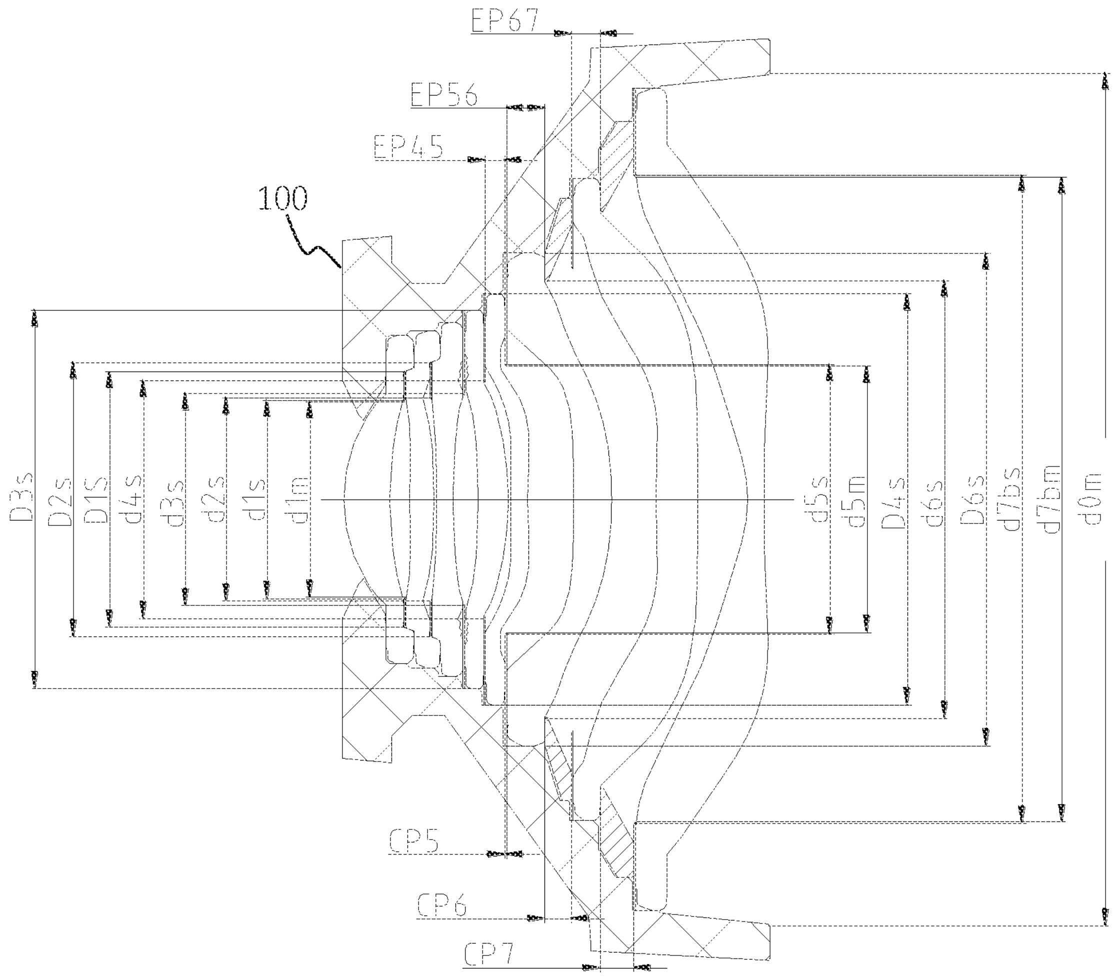
FIG. 1 is a schematic diagram of a structure and some parameters of an optical imaging lens assembly according to embodiments of the present disclosure.

For a better understanding of the present disclosure, various aspects of the present disclosure will be described in more detail with reference to the accompanying drawings. It should be understood that the detailed description is merely an illustration for an exemplary implementation of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second" and "third" are only used to distinguish one feature from another, rather than represent any limitations to the features. Thus, the first lens discussed below may alternatively be referred to as the second lens or the third lens without departing from the teachings of the present disclosure.

In the accompanying drawings, the thicknesses, sizes and shapes of the lenses are slightly exaggerated for the convenience of explanation. Specifically, the shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a paraxial area refers to an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least at the paraxial area. The determination for the surface shape at the paraxial area may be according to the method commonly used in the art. For example, whether the surface is concave or convex may be determined according to whether the R value (R refers to a radius of curvature at the paraxial area) is positive or negative. Herein, a surface of each lens that is closest to a photographed object is referred to as the object-side surface of the lens, and a surface of each lens that is closest to an image plane is referred to as the image-side surface of the lens. For the object-side surface, it is determined that the object-side surface is a convex surface when the R value is positive, and it is determined that the object-side surface is a concave surface when the R value is negative. For the image-side surface, it is determined that the image-side surface is a concave surface when the R value is positive, and it is determined that the image-side surface is a convex surface when the R value is negative.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, represents "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The following embodiments only express several implementations of the present disclosure, and the description thereof is specific and detailed, but should not be construed as a limitation to the patent scope of the present disclosure. It should be noted that those of ordinary skill in the art can make several variations and improvements without departing from the concept of the present disclosure, and these variations and improvements all fall into the scope of protection of the present disclosure. The present disclosure will be described below in detail with reference to the accompanying drawings and in combination with the embodiments.

Features, principles and other aspects of the present disclosure are described below in detail.

An optical imaging lens assembly according to exemplary implementations of the present disclosure may include a lens barrel structure, and may further include, in the lens barrel structure, a plurality of lenses arranged along a lens barrel from the side of a photographed-object to the side of an image plane and a plurality of spacing elements.

The present disclosure adopts an eight-lens structure. By reasonably distributing the refractive powers and surface shapes of the lenses, and by reasonably disposing the spacing elements to ensure that there is at least one spacing element disposed between two lenses and the inner diameter surface of the spacing element is attached to the edge of the chief ray but not intercept the chief ray, it helps to intercept an unwanted optical reflection path, thereby improving the imaging quality of the lens assembly having a large image plane, and reducing the generation of stray light and ghost images. When at least one spacing element is used between the seventh lens and the eighth lens, the field curvature can be effectively adjusted by adjusting the thickness of the spacing element in the sensitive position of the field curvature, thereby improving the performance yield. By taking at least one lens in the first lens to the fourth lens as a meniscus lens, it can be ensured that the lens assembly is ultra-thin under the premise of having good processing feasibility of the lenses, thereby providing large room for the shape design of electronic devices such as mobile phones. By setting a refractive power of the seventh lens and a refractive power of the eighth lens to be positive-negative opposite, and at the same time, by setting the distance from the center of the effective-diameter portion of the object-side surface of the eighth lens to the rear-end surface of the lens barrel along the optical axis to be less than the distance from the edge of the effective-diameter portion of the object-side surface of the eighth lens to the rear-end surface of the lens barrel along the optical axis, it can be effectively ensured that the chief ray of the imaging lens assembly has a small incident angle when being incident on the image plane, to increase the relative illumination, which helps to weaken the refraction capability of the lens and improve the imaging quality of the lens assembly having a large image plane. By reasonably controlling the radii of curvature of the object-side surface and image-side surface of the fifth lens, and the inner diameters of the object-side surface and image-side surface of the spacing element that is disposed on the image side of the fifth lens and is partially in contact with the fifth lens, the optical parameters can be effectively controlled, to greatly improve the reliability of the lens assembly under the premise of meeting the design requirements, thereby improving the imaging quality of the lens assembly.

Therefore, according to the implementations of the present disclosure, an ultra-thin optical imaging lens assembly having a large image plane can be provided. Compared with a common lens assembly having a large image plane, the optical imaging lens assembly has good processing feasibility, a good stray light status, good assembling stability, good reliability, etc., thereby achieving the ultra-thin characteristics of the lens assembly, improving the imaging quality of the lens assembly and improving the performance yield. Thus, the optical imaging lens assembly can well meet the application needs of the main cameras on the next generation of high-end smart phones.

In an exemplary implementation, for example, eight lenses may be included in the lens barrel, and may be a first lens, a second lens, a third lens, a fourth lens, a fifth lens, a sixth lens, a seventh lens and an eighth lens sequentially along an optical axis from an object side to an image side. At least seven spacing elements may be included in the lens barrel. Here, at least one spacing element is a flat-angle spacing element, and the values of inner diameters of the object-side and image-side surfaces of the flat-angle spacing element are the same. At least one spacing element is a chamfer spacing element, and the inner hole of the chamfer spacing element has a chamfer within the range from 45° to 60° on the object-side or image-side surface of the chamfer spacing element. When it is ensured that at least one spacing element is designed between two lenses and the inner diameter surface of the spacing element is attached to the edge of the chief ray but not intercept the chief ray, it helps to intercept an unwanted optical reflection path, thereby improving the imaging quality of the lens assembly having a large image plane, and reducing the generation of stray light and ghost images. When the spacing elements are assembled with the lens barrel and the lenses in sequence, the assembling stability can be ensured. By designing at least one flat-angle spacing element between two lenses, it can be ensured that the spacing element effectively intercepts the stray light on the basis of good processing feasibility, thereby achieving a high imaging quality. By designing at least one spacing element with, for example, a chamfer of 45° or 60° between two lenses, the reflection area of stray light on the inner diameter surface of the spacing element can be effectively reduced, thereby achieving a higher imaging quality.

In an exemplary implementation, in the first four lenses (i.e., the first lens to the fourth lens) of the optical imaging lens assembly close to the object side, at least one lens is a meniscus lens, that is, the object-side surface and image-side surface of at least one lens are convex-concave opposite to. In an exemplary implementation, a refractive power of the seventh lens and a refractive power of the eighth lens are positive-negative opposite. By reasonably distributing surface shapes and refractive powers, it can be ensured that the lens assembly is ultra-thin under the premise of having good processing feasibility of the lenses, thereby providing large room for the shape design of electronic devices such as mobile phones. When an object-side surface of the first lens is a convex surface and an image-side surface of the first lens is a concave surface, it can be effectively ensured that more light enters the lens to make the image of an external object formed on the chip larger. When the seventh lens has a positive refractive power and the eighth lens has a negative refractive power and a concave object-side surface, it can be effectively ensured that the chief ray of the imaging system has a small incident angle when being incident on the image plane, to increase the relative illumination, thereby improving the imaging quality.

In an exemplary implementation, the distance from a center of an effective-diameter portion of the object-side surface of the eighth lens to a rear-end surface S17 of the lens barrel along the optical axis is less than the distance from an edge of the effective-diameter portion of the object-side surface of the eighth lens to the rear-end surface S17 of the lens barrel along the optical axis. It can be effectively ensured that the chief ray of the imaging lens assembly has a small incident angle when being incident on the image plane, to increase the relative illumination, which helps to weaken the refraction capability of the lens and improve the imaging quality of the lens assembly having a large image plane.

In an exemplary implementation, in the plurality of spacing elements included in the optical imaging lens assembly, a first spacing element closest to the object side is disposed on an image side of the first lens and is partially in contact with the image-side surface of the first lens. By reasonably using spacing elements between the lenses, the stray light can be effectively reduced to improve the imaging quality of the lens assembly and improve the assembling stability of the lens assembly, thereby improving the performance yield.

In an exemplary implementation, there is at least one spacing element between the seventh lens and the eighth lens. When at least one spacing element is used between the seventh lens and the eighth lens, the field curvature can be effectively adjusted by adjusting the thickness of the spacing element in the sensitive position of the field curvature, thereby improving the performance yield.

In an exemplary implementation, the optical imaging lens assembly according to the present disclosure may satisfy the conditional expression $(R9\times R10)/(d5s\times d5m)>0.5$. Here, R9 is a radius of curvature of an object-side surface of the fifth lens, R10 is a radius of curvature of an image-side surface of the fifth lens, d5s is an inner diameter of an object-side surface of a fifth spacing element that is disposed on an image side of the fifth lens and is partially in contact with the fifth lens, and d5m is an inner diameter of an image-side surface of the fifth spacing element that is disposed on the image side of the fifth lens and is partially in contact with the fifth lens. By controlling the radius of curvature of the object-side surface of the fifth lens, the radius of curvature of the image-side surface of the fifth lens, the inner diameter of the object-side surface of the spacing element that is disposed on the image side of the fifth lens and is partially in contact with the fifth lens and the inner diameter of the image-side surface of the spacing element that is disposed on the image side of the fifth lens and is partially in contact with the fifth lens to satisfy $(R9\times R10)/(d5s\times d5m)>0.5$, the chief ray has smooth optical paths when passing through the first three lenses, and gradually steep optical paths when passing through the fourth lens, the fifth lens, the sixth lens, the seventh lens and the eighth lens. By controlling this condition, the optical parameters can be effectively controlled, to greatly improve the reliability of the lens assembly under the premise of meeting the design requirements, thereby improving the imaging quality of the lens assembly. More specifically, R9, R10, d5s and d5m may satisfy: $(R9\times R10)/(d5s\times d5m)>1.2$.

In an exemplary implementation, the optical imaging lens assembly according to the present disclosure may satisfy the conditional expression $(R1+R2)/(R2-R1)\times(d1s/d1m)>1.0$. Here, R1 is a radius of curvature of the object-side surface of the first lens, R2 is a radius of curvature of the image-side surface of the first lens, d1s is an inner diameter of an object-side surface of the first spacing element (the spacing element that is disposed on the image side of the first lens and is partially in contact with the image-side surface of the first lens), and d1m is an inner diameter of an image-side surface of the first spacing element. By controlling the radius of curvature of the object-side surface of the first lens, the radius of curvature of the image-side surface of the first lens, the inner diameter of the object-side surface of the first spacing element and the inner diameter of the image-side surface of the first spacing element to satisfy $(R1+R2)/(R2-R1)\times(d1s/d1m)>1.0$, the surface shapes of the object-side surface and image-side surface of the lens can be effectively controlled, to reduce the sensitivity of the lens and reduce the reflection of stray light on the image side of the first lens, thereby improving the performance and stray light status of the lens assembly. More specifically, R1, R2, d1s and d1m may satisfy: $(R1+R2)/(R2-R1)\times(d1s/d1m)>1.8$.

In an exemplary implementation, the optical imaging lens assembly according to the present disclosure may satisfy the conditional expression $-100.0<Rim/CTi+Dis/dis<100.0$ (i=1, 2, 3, 4). Here, Rim is a radius of curvature of an image-side surface of an i-th lens, CTi is a center thickness of the i-th lens on the optical axis, Dis is an outer diameter of an object-side surface of a spacing element that is disposed on an image side of the i-th lens and is partially in contact with an image-side surface of the i-th lens, and dis is an inner diameter of the object-side surface of the spacing element that is disposed on the image side of the i-th lens and is partially in contact with the image-side surface of the i-th lens. By controlling the radius of curvature of the image-side surface of the i-th lens, the center thickness of the i-th lens on the optical axis, the outer diameter of the object-side surface of the spacing element that is disposed on the image side of the i-th lens and is partially in contact with the image-side surface of the i-th lens and the inner diameter of the object-side surface of the spacing element that is disposed on the image side of the i-th lens and is partially in contact with the image-side surface of the i-th lens to satisfy $-100.0<Rim/CTi+Dis/dis<100.0$ (i=1, 2, 3, 4), the sizes of the outer diameters of the first four lenses (the first lens to the fourth lens) can be effectively controlled, and thus the ratio of the outer diameter of the lens to the center thickness of the lens on the optical axis is effectively controlled, which is conducive to reducing the risk of injection molding of the lens. In addition, controlling the sizes of the outer diameters of the first four lenses is conducive to ensuring the uniformity of the thickness of the lens barrel and reducing the risk of abnormal appearance of the lens barrel due to partial non-uniform thickness during injection molding. Controlling the ratio of Dis to dis is conducive to reducing the stray light caused by the reflection of the optical paths between the first four lenses, thereby effectively improving the imaging quality of the lens assembly. More specifically, Rim, CTi, Dis and dis may satisfy: $-85.0<Rim/CTi+Dis/dis<85.0$ (i=1, 2, 3, 4).

In an exemplary implementation, the optical imaging lens assembly according to the present disclosure may satisfy the conditional expression $EP(j-1)/CPj+T(j-1)/CTj>0.5$ (j=5, 6, 7). Here, Ep(j−1) is a spacing distance between a spacing element that is disposed on an image side of a (j−1)-th lens and is partially in contact with an image-side surface of the (j−1)-th lens and a spacing element that is disposed on an image side of a j-th lens and is partially in contact with an image-side surface of the j-th lens along the optical axis, CPj is a maximal thickness of the spacing element that is disposed on the image side of the j-th lens and is partially in contact with the image-side surface of the j-th lens, T(j−1) is an air spacing between the (j−1)-th lens and the j-th lens on the optical axis, and CTj is a center thickness of the j-th lens on the optical axis. By controlling the spacing distance between the spacing element that is disposed on the image side of the (j−1)-th lens and is partially in contact with the image-side surface of the (j−1)-th lens and the spacing element that is disposed on the image side of the j-th lens and is partially in contact with the image-side surface of the j-th lens along the optical axis, the maximal thickness of the spacing element that is disposed on the image side of the j-th lens and is partially in contact with the image-side surface of the j-th lens, the air spacing between the (j−1)-th lens and the j-th lens on the optical axis and the center thickness of the j-th lens on the optical axis to satisfy $EP(j-1)/CPj+T(j-1)/CTj>0.5$ (j=5, 6, 7), and by controlling the edge thickness of the lens and the center thickness of the lens on the optical axis, it can be ensured that the lens has good processing feasibility, and the precision of the bearing positions between the assembled lenses can be effectively ensured, which makes the optical parameters of the lens assembly meet the design requirements. In addition, by reasonably controlling the edge thickness of the lens and the center thickness of the lens on the optical axis, the interference between the lens and the effective diameter surface of the lens in the direction of the optical axis after the assembling can be prevented, which avoids the occurrence of a lens appearance problem and the problem of abnormal performance, thereby improving the appearance and performance yield. Preferably, EP(j−1), CPj, T(j−1) and CTj may satisfy: $1.0<EP(j-1)/CPj+T(j-1)/CTj<20.0$ (j=5, 6, 7). By controlling the conditional expression, it can be ensured that the lens has good processing feasibility, and the precision of the bearing positions between the assembled lenses can be effectively controlled. Moreover, the interference between the lens and the effective diameter surface of the lens in the direction of the optical axis after the assembling can be prevented, which effectively avoids the occurrence of a lens appearance problem and the problem of abnormal performance. The fifth lens, the sixth lens and the seventh lens after the assembling can have a better air gap values along the optical axis, thereby further improving the appearance and performance yield.

In an exemplary implementation, two spacing elements may be included between the seventh lens and the eighth lens. Here, one spacing element may be a seventh spacing element that is disposed on an image side of the seventh lens and is partially in contact with an image-side surface of the seventh lens, and the other one may be an eighth spacing element disposed on an image side of the seventh spacing element. The spacing element (seventh spacing element) that is disposed on the image side of the seventh lens and is partially in contact with the image-side surface of the seventh lens can effectively avoid the risk of injection molding of a lens and the risk of the assembling stability caused by the large structural difference between the seventh lens and the eighth lens, which can effectively improve the reliability of the lens assembly and the formability the lens. However, the inner diameter surface of this spacing element is not designed to be attached to the edge of the chief ray, which cannot effectively intercept the stray light formed by the reflection of the optical paths between the first seven lenses. Therefore, the inner diameter surface of the spacing element (eighth spacing element) next to the spacing elements that is disposed on the image side of the seventh lens and are partially in contact with the seventh lens is designed to be attached to the edge of the chief ray, which can effectively intercept the stray light, thereby improving the imaging quality of the lens assembly.

In an exemplary implementation, the optical imaging lens assembly according to the present disclosure may satisfy the conditional expression (R16-R15)/f8×(d7bs/d7bm)>15.0. Here, R16 is a radius of curvature of an image-side surface of the eighth lens, R15 is a radius of curvature of the object-side surface of the eighth lens, f8 is an effective focal length of the eighth lens, d7bs is an inner diameter of an object-side surface of the spacing element (the eighth spacing element) that is next to the seventh spacing element and disposed on the image side of the seventh spacing element (the spacing element that is disposed on the image side of the seventh lens and is partially in contact with the seventh lens)), where the elements are arranged sequentially from the object side to the image side, and d7bm is an inner diameter of an image-side surface of the spacing element (the eighth spacing element) that is next to the seventh spacing element and disposed on the image side of the seventh spacing element, where the elements are arranged sequentially from the object side to the image side. By controlling the radius of curvature of the image-side surface of the eighth lens, the radius of curvature of the object-side surface of the eighth lens, the effective focal length of the eighth lens, the inner diameter of the object-side surface of the spacing element that is next to the seventh spacing element and disposed on the image side of the seventh spacing element, where the elements are arranged sequentially from the object side to the image side, and the inner diameter of the image-side surface of the spacing element to satisfy (R16−R15)/f8×(d7bs/d7bm)>15.0, the eighth lens is a lens with the largest outer diameter in a lens assembly having a large 8P image plane, and thus, there is a large risk of molding and a large risk of producing stray light. By controlling this conditional expression, the surface shape of the eighth lens can be effectively controlled to ensure a smooth curve trend of the image plane. Accordingly, the wavefront curve of the colloidal sol is relatively smooth during injection molding, resulting in no convergence wrapping phenomenon, and thus, the risk of a welding mark is reduced, thereby reducing the risk of causing stray light and an appearance problem at the welding mark. By controlling the inner diameters of the object-side and image-side surfaces of the spacing element (eighth spacing element) next to the spacing elements that is disposed on the image side of the seventh lens and is partially in contact with the seventh lens, the reflection optical path and the reflection area can be intercepted, thereby improving the imaging quality of the lens assembly. Preferably, R16, R15, f8, d7bs and d7bm may satisfy: 20.0<(R16−R15)/f8×(d7bs/d7bm)<80.0. By controlling this conditional expression, it can be ensured that the lens with a large outer diameter has good processing feasibility, to further reduce the risk of the welding mark and the risk of producing the stray light due to the welding mark, and the reflection optical path is effectively intercepted to reduce the number of light spots formed by the stray light on the image plane, thereby further improving the imaging quality of the lens assembly.

In an exemplary implementation, the optical imaging lens assembly according to the present disclosure may satisfy the conditional expression (D6s+d6s)/EP67+T67/CT6>20.0. Here, D6s is an outer diameter of an object-side surface of a sixth spacing element that is disposed on an image side of the sixth lens and is partially in contact with an image-side surface of the sixth lens, d6s is an inner diameter of the object-side surface of the sixth spacing element that is disposed on the image side of the sixth lens and is partially in contact with the image-side surface of the sixth lens, EP67 is a spacing distance between the spacing element that is disposed on the image side of the sixth lens and is partially in contact with the image-side surface of the sixth lens and the spacing element that is disposed on the image side of the seventh lens and is partially in contact with the image-side surface of the seventh lens along the optical axis, T67 is an air spacing between the sixth lens and the seventh lens on the optical axis, and CT6 a center thickness of the sixth lens on the optical axis. By controlling the outer diameter of the object-side surface of the sixth spacing element that is disposed on the image side of the sixth lens and is partially in contact with the image-side surface of the sixth lens, the inner diameter of the object-side surface of the sixth spacing element that is disposed on the image side of the sixth lens and is partially in contact with the image-side surface of the sixth lens, the spacing distance between the spacing element that is disposed on the image side of the sixth lens and is partially in contact with the image-side surface of the sixth lens and the spacing element that is disposed on the image side of the seventh lens and is partially in contact with the image-side surface of the seventh lens along the optical axis, the air spacing between the sixth lens and the seventh lens on the optical axis and the center thickness of the sixth lens on the optical axis to satisfy (D6s+d6s)/EP67+T67/CT6>20.0, the rationality of the overall structure of the lens assembly having a large image plane can be ensured. The distance from the object-side surface of the first lens to the image-side surface of the eighth lens along the optical axis is determined by the entire optical path. Controlling this conditional expression helps to further control the ratio of T67/CT6, which can ensure that the design for the thick air gap in the air of the lens assembly is rational, thereby ensuring the good formability of the lens and the assembling stability. More specifically, D6s, d6s, EP67, T67 and CT6 may satisfy: (D6s+d6s)/EP67+T67/CT6>27.0.

In an exemplary implementation, the optical imaging lens assembly according to the present disclosure may satisfy the conditional expression EP12/CP1+CT1/T12>10.0. Here, EP12 is a spacing distance between the first spacing element and a second spacing element that is disposed on an image side of the second lens and is partially in contact with an image-side surface of the second lens along the optical axis, CP1 is a maximal thickness of the first spacing element, CT1 is a center thickness of the first lens on the optical axis, and T12 is an air spacing between the first lens and the second lens on the optical axis. By controlling the spacing distance between the first spacing element and the spacing element that is disposed on the image side of the second lens and is partially in contact with the image-side surface of the second lens along the optical axis, the maximal thickness of the first spacing element, the center thickness of the first lens on the optical axis and the air spacing between the first lens and the second lens on the optical axis to satisfy EP12/CP1+CT1/T12>10.0, the interference between the lenses along the optical axis after the assembling can be effectively avoided, which reduces the difficulty of assembling the lenses, thereby improving the processing feasibility of the lenses. More specifically, EP12, CP1, CT1 and T12 may satisfy: EP12/CP1+CT1/T12>14.0.

In an exemplary implementation, the optical imaging lens assembly according to the present disclosure may satisfy the conditional expression (T56+CT6)/(EP56+CP6)×(R11/f6)<0. Here, T56 is an air spacing between the fifth lens and the sixth lens on the optical axis, CT6 is a center thickness of the sixth lens on the optical axis, EP56 is a spacing distance between a fifth spacing element that is disposed on the image side of the fifth lens and is partially in contact with the image-side surface of the fifth lens and the sixth spacing element that is disposed on the image side of the sixth lens and is partially in contact with the image-side surface of the sixth lens along the optical axis, CP6 is a maximal thickness of the spacing element that is disposed on the image side of the sixth lens and is partially in contact with the image-side surface of the sixth lens, R11 is a radius of curvature of an object-side surface of the sixth lens, and f6 is an effective focal length of the sixth lens. When the air spacing between the fifth lens and the sixth lens on the optical axis, the center thickness of the sixth lens on the optical axis, the spacing distance between the spacing element that is disposed on the image side of the fifth lens and is partially in contact with the image-side surface of the fifth lens and the spacing element that is disposed on the image side of the sixth lens and is partially in contact with the image-side surface of the sixth lens along the optical axis, the maximal thickness of the spacing element that is disposed on the image side of the sixth lens and is partially in contact with the image-side surface of the sixth lens, the radius of curvature of the object-side surface of the sixth lens and the effective focal length of the sixth lens are controlled to satisfy $(T56+CT6)/(EP56+CP6)\times(R11/f6)<0$, it is conducive to controlling the incident angle of light in the off-axis field of view on the image plane, to increase the degree of matching with the photosensitive element and the bandpass filter. In addition, it is conducive to controlling the thickness-thinness ratio and surface shape of the sixth lens to ensure that the sixth lens has good processing feasibility. More specifically, T56, CT6, EP56, CP6, R11 and f6 may satisfy: $(T56+CT6)/(EP56+CP6)\times(R11/f6)<-1$.

In an exemplary implementation, the optical imaging lens assembly according to the present disclosure may satisfy the conditional expression $(d0m+D0m)/L+TD/f>2.0$. Here, d0m is an inner diameter of an end surface of the lens barrel closest to the image side, D0m is an outer diameter of the end surface of the lens barrel closest to the image side, L is a distance from an end surface of the lens barrel closest to a photographed object to the end surface closest to the image side, TD is a distance from the object-side surface of the first lens to the image-side surface of the eighth lens along the optical axis, and f is an effective focal length of the optical imaging lens assembly. By controlling the inner diameter of the end surface of the lens barrel closest to the image side, the outer diameter of the end surface of the lens barrel closest to the image side, the distance from the end surface of the lens barrel closest to the photographed object to the end surface closest to the image side, the distance from the object-side surface of the first lens to the image-side surface of the eighth lens along the optical axis and the effective focal length of the optical imaging lens assembly to satisfy $(d0m+D0m)/L+TD/f>2.0$, the size of the rear end of the lens assembly having a large image plane and the height of the lens barrel can be effectively controlled, which is conducive to ensuring the size of the large end of the lens assembly and the total height of the lens barrel, helping to realize the characteristics of an ultra-thin and miniaturized lens assembly, and at the same time helping to further control the ratio of TD/f. Thus, the imaging quality can be effectively ensured. More specifically, d0m, D0m, L, TD and f may satisfy: $(d0m+D0m)/L+TD/f>3.4$.

In an exemplary implementation, the fifth lens may have a negative refractive power, the object-side surface of the fifth lens may be a convex surface, and the image-side surface of the fifth lens may be a concave surface, which can effectively shorten the total length of the lens assembly while ensuring good processability, thereby realize the ultra-thin characteristics of the lens assembly having a large image plane. The seventh lens may have a positive refractive power. The positive refractive power is conducive to ensuring that the lens may converge the incident parallel light beam. The eighth lens may have a negative refractive power, and the object-side surface of the eighth lens may be a concave surface. By reasonably distributing the refractive power and surface shape, the refraction capability of the lens can be effectively weakened, thereby improving the imaging quality of the lens assembly having a large image plane.

In an exemplary implementation, the first lens may have a positive refractive power, the object-side surface of the first lens may be a convex surface, and the image-side surface of the first lens may be a concave surface. When the object-side surface of the first lens is a convex surface, it is conducive to ensuring that the chief ray of the imaging system has a small incident angle when being incident on the image plane, which can effectively reduce the outer diameter of the first lens and further reduce the size of the outer diameter of the fastening lens, thereby reducing the size of the head part the lens assembly having a large 8P image plane to make the structure of the lens assembly more compact. The second lens may have a positive refractive power, and the object-side surface of the second lens may be a convex surface. By reasonably distributing the refractive power and surface shape, the refraction capability of the lens can be effectively improved, thereby improving the imaging quality of the lens assembly having a large image plane and achieving the ultra-thin characteristics.

In an exemplary implementation, the optical imaging lens assembly according to the present disclosure may include at least one diaphragm. The diaphragm can restrict the optical path and control the light intensity. The diaphragm may be disposed at an appropriate position of the optical imaging lens assembly. For example, the diaphragm may be disposed between the object side and the first lens.

In an exemplary implementation, alternatively, the above optical imaging lens assembly may further include an optical filter for correcting color deviations and/or a protective glass for protecting a photosensitive element on the image plane.

In an exemplary implementation, the effective focal length f of the optical imaging lens assembly may be, for example, in the range from 4.7 mm to 5.5 mm. An effective focal length f1 of the first lens may be, for example, in the range from 6.0 mm to 6.9 mm. An effective focal length f2 of the second lens may be, for example, in the range from 14.5 mm to 16.4 mm. An effective focal length f3 of the third lens may be, for example, in the range from −23.1 mm to −11.6 mm. An effective focal length f4 of the fourth lens may be, for example, in the range from 7.9 mm to 10.3 mm. An effective focal length f5 of the fifth lens may be, for example, in the range from −12.5 mm to −10.0 mm. The effective focal length f6 of the sixth lens may be, for example, in the range from 8.1 mm to 9.2 mm. An effective focal length f7 of the seventh lens may be, for example, in the range from 14.6 mm to 32.0 mm. The effective focal length f8 of the eighth lens may be, for example, in the range from −3.1 mm to −2.7 mm.

The optical imaging lens assembly according to the implementations of the present disclosure may use a plurality of lenses, for example, the eight lenses described above. By reasonably distributing the refractive powers, the surface types, etc. of the lenses, and by reasonably disposing the spacing elements, an ultra-thin optical imaging lens assembly having a large image plane can be provided. Compared with a common lens assembly having a large image plane, the optical imaging lens assembly has good processing feasibility, a good stray light status, good reliability, etc., and thus can well meet the application needs of the main cameras on the next generation of high-end smart phones.

In the implementations of the present disclosure, at least one of the surfaces of the first lens, the second lens, the third lens, the fourth lens, the fifth lens, the sixth lens, the seventh lens and the eighth lens may be an aspheric surface, that is, the object-side surface of the first lens to the image-side surface of the eighth lens may include at least one aspheric surface. An aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality. Alternatively, at least one of the object-side surface and image-side surface of each of the first lens, the second lens, the third lens, the fourth lens, the fifth lens, the sixth lens, the seventh lens and the eighth lens is an aspheric surface. Alternatively, the object-side surface and image-side surface of each of the first lens, the second lens, the third lens, the fourth lens, the fifth lens, the sixth lens, the seventh lens and the eighth lens are aspheric surfaces.

However, it should be understood by those of ordinary skill in the art that the various results and advantages described in the present specification may be obtained by changing the number of the lenses constituting the optical imaging lens assembly or changing the number of the spacing elements without departing from the technical solution claimed by the present disclosure. For example, although the optical imaging lens assembly having eight lenses is described as an example in the implementations, the optical imaging lens assembly is not limited to including the eight lenses. If desired, the optical imaging lens assembly may alternatively include other numbers of lenses.

Specific embodiments of the optical imaging lens assembly that may be applicable to the implementations are further described below with reference to the accompanying drawings.

Embodiment 1

Figure 2A:
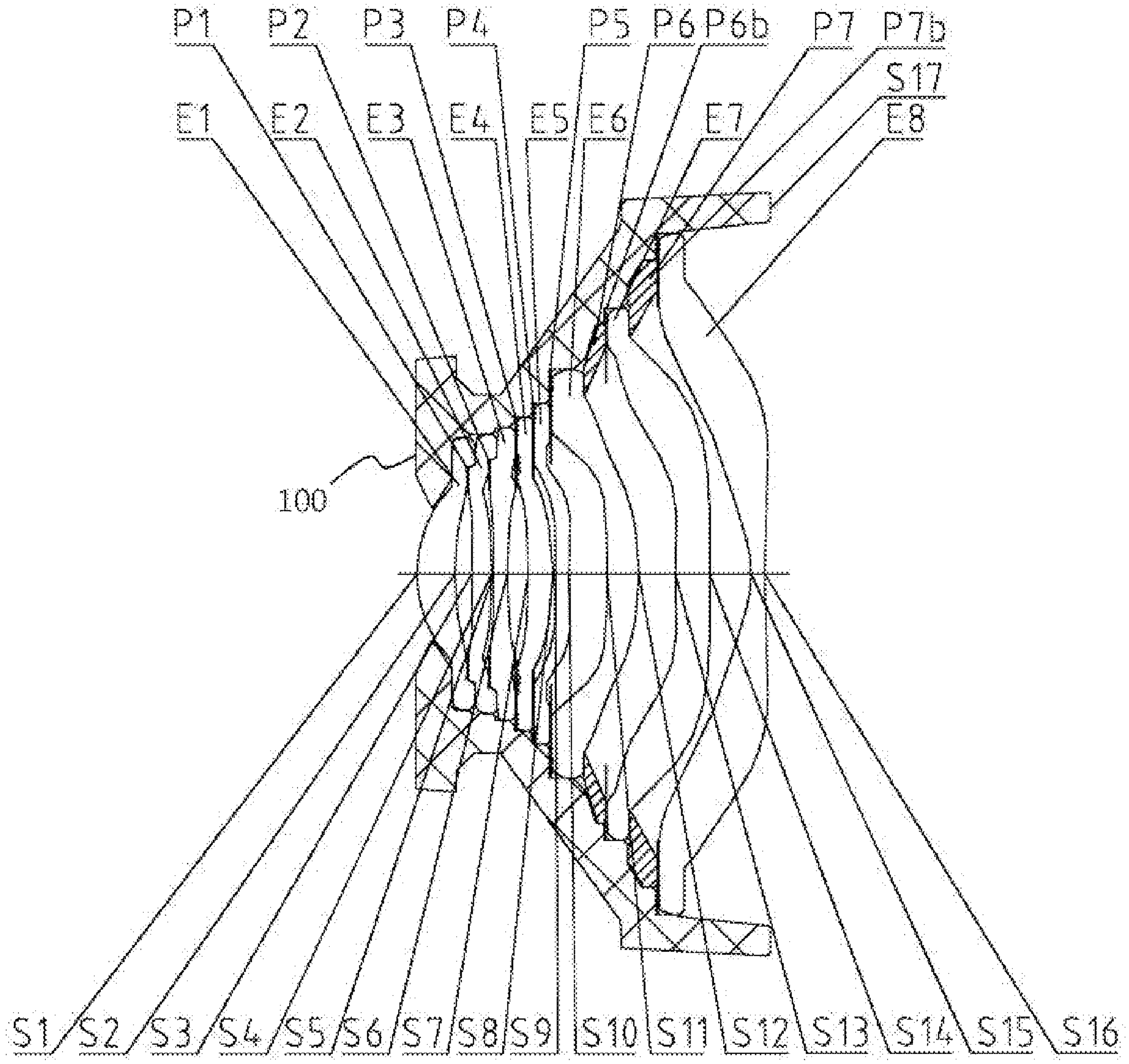
FIGS. 2A-2C are schematic structural diagrams of an optical imaging lens assembly in three implementations according to Embodiment 1 of the present disclosure.
Figure 2B:
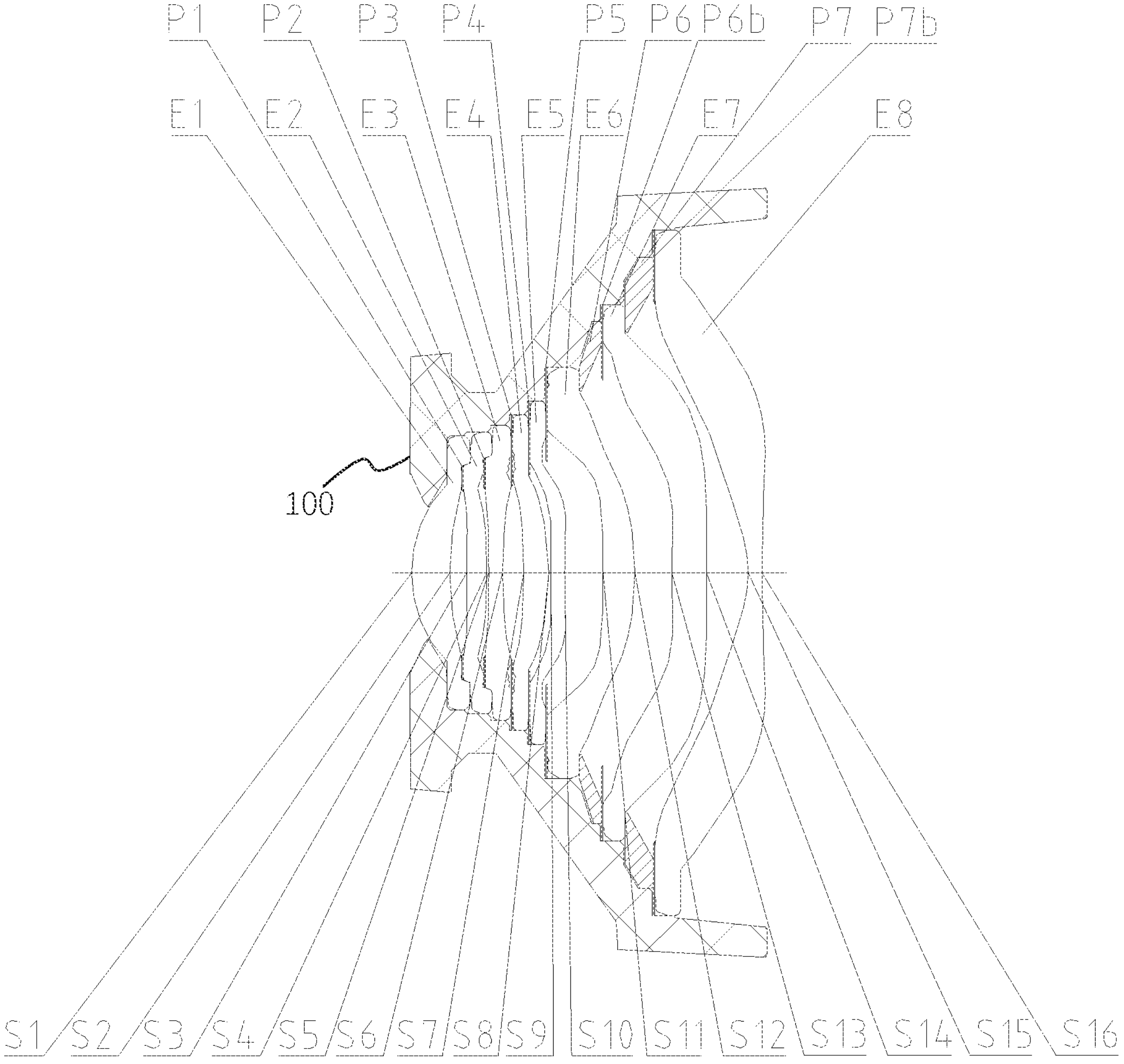
Figure 2C:
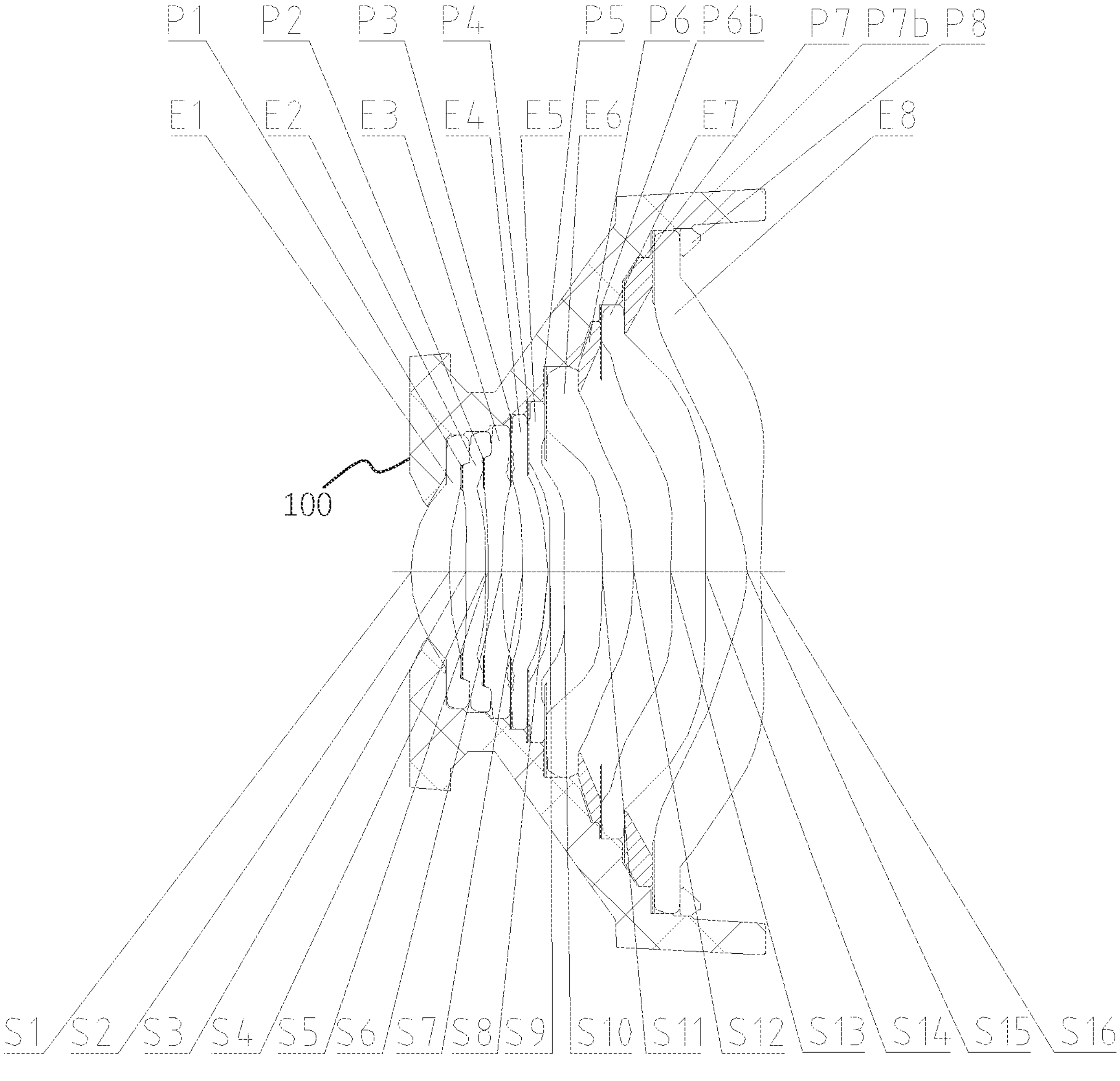

An optical imaging lens assembly according to Embodiment 1 of the present disclosure is described below with reference to FIGS. 2A-2C and FIGS. 3A-3D. FIGS. 2A-2C are schematic structural diagrams of the optical imaging lens assembly in three different implementations according to Embodiment 1 of the present disclosure.

As shown in FIGS. 2A-2C, the optical imaging lens assembly includes a lens barrel 100, and a first lens E1, a second lens E2, a third lens E3, a fourth lens E4, a fifth lens E5, a sixth lens E6, a seventh lens E7 and an eighth lens E8 that are accommodated in the lens barrel 100 and arranged in sequence along an optical axis from an object side to an image side.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a convex surface. The third lens E3 has a negative refractive power, an object-side surface S5 of the third lens E3 is a concave surface, and an image-side surface S6 of the third lens E3 is a concave surface. The fourth lens E4 has a positive refractive power, an object-side surface S7 of the fourth lens E4 is a concave surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a concave surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a concave surface. The eighth lens E8 has a negative refractive power, an object-side surface S15 of the eighth lens E8 is a concave surface, and an image-side surface S16 of the eighth lens E8 is a convex surface. The optical imaging lens assembly may further include an optical filter E9 (not shown), and the optical filter E9 may have an object-side surface S17 and an image-side surface S18. The optical imaging lens assembly may further include an image plane S19 (not shown). Light from an object may sequentially pass through the surfaces S1-S18, and finally forms an image on the image plane S19.

Table 1 shows basic parameters of the optical imaging lens assembly in Embodiment 1. Here, the units of a radius of curvature and a thickness/distance are millimeters (mm).

TABLE 1

| | | | | material | | |
|---|---|---|---|---|---|---|
| surface number | surface type | radius of curvature | thickness/distance | refractive index | abbe number | conic coefficient |
| OBJ | spherical | infinite | infinite | | | |
| STO | spherical | | −0.4611 | | | |
| S1 | aspheric | 1.9829 | 0.5551 | 1.54 | 56.0 | 0.1710 |
| S2 | aspheric | 4.4176 | 0.2458 | | | 2.3654 |
| S3 | aspheric | 12.3893 | 0.2937 | 1.54 | 56.0 | −38.4474 |
| S4 | aspheric | −21.8850 | 0.0300 | | | 56.0115 |
| S5 | aspheric | −200.0000 | 0.2000 | 1.68 | 19.2 | −99.0000 |
| S6 | aspheric | 8.2925 | 0.3080 | | | 17.3724 |
| S7 | aspheric | −8.2095 | 0.3676 | 1.54 | 56.0 | 33.3733 |
| S8 | aspheric | −3.1291 | 0.0300 | | | 0.6727 |
| S9 | aspheric | 7.6049 | 0.2000 | 1.64 | 22.4 | 2.5184 |
| S10 | aspheric | 3.6993 | 0.5586 | | | −3.9704 |
| S11 | aspheric | −200.0000 | 0.4652 | 1.62 | 25.2 | −99.0000 |
| S12 | aspheric | −4.9889 | 0.5386 | | | −0.4598 |
| S13 | aspheric | 7.9354 | 0.5041 | 1.56 | 39.4 | −1.1858 |

TABLE 1-continued

| surface number | surface type | radius of curvature | thickness/distance | material: refractive index | material: abbe number | conic coefficient |
|---|---|---|---|---|---|---|
| S14 | aspheric | 187.5202 | 0.6082 | | | −99.0000 |
| S15 | aspheric | −1.6951 | 0.2000 | 1.60 | 29.6 | −1.0289 |
| S16 | aspheric | −200.0000 | 0.0602 | | | −99.0000 |
| S17 | spherical | infinite | 0.1100 | 1.52 | 64.2 | |
| S18 | spherical | infinite | 0.5048 | | | |
| S19 | spherical | infinite | | | | |

In Embodiment 1, the object-side surface and the image-side surface of any lens in the first to eighth lenses E1-E8 are both aspheric surfaces, and the surface type x of each aspheric lens may be defined using, but not limited to, the following formula:

$$x = \frac{ch^2}{1 + \sqrt{1 - (k+1)c^2h^2}} + \sum Aih^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and Ai is the correction coefficient of an i-th order of the aspheric surface. Tables 2-1 and 2-2 below show the high-order coefficients $A_4$, $A_6$, $A_8$, $A_{10}$, $A_{12}$, $A_{14}$, $A_{16}$, $A_{18}$, $A_{20}$, $A_{22}$ and $A_{24}$ applicable to the aspheric surfaces S1-S16 in Embodiment 1.

TABLE 2-1

| surface number | A4 | A6 | A8 | A10 | A12 | A14 |
|---|---|---|---|---|---|---|
| S1 | 7.8303E−03 | 3.4653E−03 | 8.0285E−04 | 2.2942E−04 | 2.5292E−05 | 1.4876E−05 |
| S2 | −1.8563E−02 | 4.3906E−03 | 1.0031E−03 | −2.7190E−04 | −2.7783E−04 | −2.1749E−04 |
| S3 | −8.6957E−02 | 4.5092E−03 | 3.0107E−04 | −1.6624E−04 | −4.5188E−05 | −1.5997E−05 |
| S4 | −9.9953E−02 | 8.6366E−03 | 6.2181E−04 | 1.4587E−05 | 3.9124E−04 | −1.6022E−04 |
| S5 | −6.8167E−02 | 8.1950E−03 | 3.0722E−03 | −4.8909E−04 | 1.6677E−04 | −5.6756E−05 |
| S6 | 2.8192E−03 | 8.6038E−03 | 5.4555E−03 | 2.2850E−04 | 5.1798E−05 | −9.6068E−05 |
| S7 | 1.2448E−02 | −1.1695E−02 | 5.5584E−03 | 5.4170E−04 | 2.7774E−04 | 1.3607E−06 |
| S8 | 8.7362E−02 | −2.9265E−02 | 6.7198E−03 | −3.5155E−03 | −1.4448E−03 | −1.4627E−04 |
| S9 | −3.8761E−01 | 4.1999E−02 | −4.2218E−03 | 1.0393E−03 | −2.8167E−03 | 2.7626E−04 |
| S10 | −6.4160E−01 | 5.9500E−02 | −7.7958E−03 | 7.9493E−03 | −1.5703E−03 | 7.5960E−04 |
| S11 | −4.4591E−01 | −5.5731E−02 | 1.8365E−04 | 6.4738E−03 | 1.7590E−03 | 3.2773E−04 |
| S12 | −1.9162E−01 | 1.0011E−01 | −2.1734E−03 | −7.2906E−03 | −4.6085E−03 | 2.4948E−03 |
| S13 | −1.8504E+00 | 5.4511E−01 | −1.0047E−01 | −1.0127E−02 | 9.1315E−03 | −1.3823E−03 |
| S14 | −1.1228E+00 | −1.6949E−02 | 2.0849E−02 | 7.3992E−03 | 9.3985E−03 | 6.6208E−03 |
| S15 | 3.3537E+00 | −7.2877E−01 | 3.1200E−01 | −1.2187E−01 | 4.9825E−02 | −1.7408E−02 |
| S16 | −9.7574E−01 | −6.9583E−02 | 1.5400E−01 | −6.3293E−02 | 2.0322E−02 | −1.3635E−02 |

TABLE 2-2

| surface number | A16 | A18 | A20 | A22 | A24 |
|---|---|---|---|---|---|
| S1 | −8.9591E−06 | 4.1271E−06 | −8.1524E−07 | 0.0000E+00 | 0.0000E+00 |
| S2 | −9.7789E−05 | −4.8838E−05 | −1.2936E−06 | 0.0000E+00 | 0.0000E+00 |
| S3 | −2.8750E−05 | 1.0853E−06 | −4.8408E−06 | 0.0000E+00 | 0.0000E+00 |
| S4 | 5.7759E−05 | −6.3054E−06 | 3.7211E−06 | 0.0000E+00 | 0.0000E+00 |
| S5 | 3.1846E−04 | 1.9330E−05 | 6.0346E−07 | 0.0000E+00 | 0.0000E+00 |
| S6 | 3.0639E−05 | 9.1177E−06 | 2.6777E−06 | 0.0000E+00 | 0.0000E+00 |
| S7 | −6.1185E−07 | 1.5288E−05 | −6.9808E−06 | 0.0000E+00 | 0.0000E+00 |
| S8 | −1.4539E−04 | 1.4530E−04 | −3.8326E−05 | 0.0000E+00 | 0.0000E+00 |
| S9 | −3.5697E−04 | 1.7506E−04 | −7.4464E−05 | 0.0000E+00 | 0.0000E+00 |
| S10 | −3.6215E−04 | 1.0863E−04 | −5.4631E−05 | 0.0000E+00 | 0.0000E+00 |
| S11 | 1.1383E−05 | −1.2792E−05 | −4.4608E−05 | 0.0000E+00 | 0.0000E+00 |
| S12 | 1.3235E−03 | −5.6635E−04 | −2.5708E−04 | 9.8490E−05 | 0.0000E+00 |
| S13 | 6.4780E−04 | −1.1732E−03 | 3.9006E−04 | 2.9108E−04 | −1.4523E−04 |
| S14 | 5.9263E−04 | −1.3947E−03 | −1.2094E−03 | −6.4072E−04 | 1.8205E−04 |
| S15 | 2.5515E−04 | 5.3557E−04 | 1.5350E−04 | 3.0029E−04 | −1.2697E−04 |
| S16 | 2.8926E−03 | −1.0448E−03 | 6.3858E−04 | 5.3859E−04 | −2.6511E−04 |

For example, as shown in FIG. 2A, according to Embodiment 1-1, the optical imaging lens assembly may further include spacing elements accommodated in the lens barrel 100 and disposed between the lenses, for example, a spacing element P1 (first spacing element) that is disposed on the image side of the first lens and is partially in contact with the image-side surface of the first lens; a spacing element P2 that is disposed on the image side of the second lens and is partially in contact with the image-side surface of the second lens; a spacing element P3 that is disposed on the image side of the third lens and is partially in contact with the image-side surface of the third lens; a spacing element P4 that is disposed on the image side of the fourth lens and is partially in contact with the image-side surface of the fourth lens; a spacing element P5 that is disposed on the image side of the fifth lens and is partially in contact with the image-side surface of the fifth lens; a spacing element P6 (sixth spacing element) that is disposed on the image side of the sixth lens and is partially in contact with the image-side surface of the sixth lens, and a spacing element P6*b* disposed between the image-side surface of the sixth spacing element P6 and the object-side surface of the seventh lens; and a spacing element P7 (seventh spacing element) that is disposed on the image side of the seventh lens and is partially in contact with the image-side surface of the seventh lens, and a spacing element P7*b* (eighth spacing element) disposed between the image-side surface of the seventh spacing element P7 and the object-side surface of the eighth lens.

In Embodiment 1-1, the values of relevant parameters are as shown in Table 3-1 below. Here, d1s is an inner diameter of the object-side surface of the spacing element (first spacing element, P1) that is disposed on the image side of the first lens and is partially in contact with the image-side surface of the first lens; d1m is an inner diameter of the image-side surface of the spacing element (first spacing element, P1) that is disposed on the image side of the first lens and is partially in contact with the image-side surface of the first lens; D1 s is an outer diameter of the object-side surface of the spacing element (first spacing element, P1) that is disposed on the image side of the first lens and is partially in contact with the image-side surface of the first lens; d2s is an inner diameter of the object-side surface of the spacing element (P2) that is disposed on the image side of the second lens and is partially in contact with the image-side surface of the second lens; D2s is an outer diameter of the object-side surface of the spacing element (P2) that is disposed on the image side of the second lens and is partially in contact with the image-side surface of the second lens; d3s is an inner diameter of the object-side surface of the spacing element (P3) that is disposed on the image side of the third lens and is partially in contact with the image-side surface of the third lens; D3s is an outer diameter of the object-side surface of the spacing element (P3) that is disposed on the image side of the third lens and is partially in contact with the image-side surface of the third lens; d4s is an inner diameter of the object-side surface of the spacing element (P4) that is disposed on the image side of the fourth lens and is partially in contact with the image-side surface of the fourth lens; D4s is an outer diameter of the object-side surface of the spacing element (P4) that is disposed on the image side of the fourth lens and is partially in contact with the image-side surface of the fourth lens; d5s is an inner diameter of the object-side surface of the spacing element (P5) that is disposed on the image side of the fifth lens and is partially in contact with the image-side surface of the fifth lens; d5m is an inner diameter of the image-side surface of the spacing element (P5) that is disposed on the image side of the fifth lens and is partially in contact with the image-side surface of the fifth lens; d6s is an inner diameter of the object-side surface of the spacing element (P6) that is disposed on the image side of the sixth lens and is partially in contact with the image-side surface of the sixth lens; D6s is an outer diameter of the object-side surface of the spacing element (P6) that is disposed on the image side of the sixth lens and is partially in contact with the image-side surface of the sixth lens; EP45 is a spacing distance between the spacing element (P4) that is disposed on the image side of the fourth lens and is partially in contact with the image-side surface of the fourth lens and the spacing element (P5) that is disposed on the image side of the fifth lens and is partially in contact with the image-side surface of the fifth lens along the optical axis; EP56 is a spacing distance between the spacing element (P5) that is disposed on the image side of the fifth lens and is partially in contact with the image-side surface of the fifth lens and the spacing element (P6) that is disposed on the image side of the sixth lens and is partially in contact with the image-side surface of the sixth lens along the optical axis; CP6 is a center thickness of the sixth lens on the optical axis; EP67 is a spacing distance between the spacing element (P6) that is disposed on the image side of the sixth lens and is partially in contact with the image-side surface of the sixth lens and the spacing element (seventh spacing element, P7) that is disposed on the image side of the seventh lens and is partially in contact with the image-side surface of the seventh lens along the optical axis; CP7 is a center thickness of the seventh lens on the optical axis; d7bs is an inner diameter of the object-side surface of the spacing element (eighth spacing element, P7*b*) disposed between the image-side surface of the seventh spacing element (P7) and the object-side surface of the eighth lens; and d7bm is an inner diameter of the image-side surface of the spacing element (eighth spacing element, P7*b*) disposed between the image-side surface of the seventh spacing element (P7) and the object-side surface of the eighth lens. The units of the parameters in Table 3-1 are millimeters (mm).

TABLE 3-1

| d1s | d1m | D1s | d2s | D2s | d3s | D3s | d4s | D4s | d5s | d5m |
|---|---|---|---|---|---|---|---|---|---|---|
| 2.380 | 2.380 | 3.112 | 2.440 | 3.332 | 2.540 | 4.600 | 2.860 | 5.000 | 3.240 | 3.240 |
| d6s | D6s | EP45 | CP5 | EP56 | CP6 | EP67 | CP7 | d7bs | d7bm | |
| 5.328 | 6.000 | 0.236 | 0.022 | 0.466 | 0.324 | 0.346 | 0.411 | 7.840 | 7.840 | |

For example, as shown in FIG. 2B, according to Embodiment 1-2, the optical imaging lens assembly may further include spacing elements accommodated in the lens barrel 100 and disposed between the lenses, for example, a spacing element P1 (first spacing element) that is disposed on the image side of the first lens and is partially in contact with the image-side surface of the first lens; a spacing element P2 that is disposed on the image side of the second lens and is partially in contact with the image-side surface of the second lens; a spacing element P3 that is disposed on the image side of the third lens and is partially in contact with the image-side surface of the third lens; a spacing element P4 that is disposed on the image side of the fourth lens and is partially in contact with the image-side surface of the fourth lens; a spacing element P5 that is disposed on the image side of the fifth lens and is partially in contact with the image-side surface of the fifth lens; a spacing element P6 (sixth spacing element) that is disposed on the image side of the sixth lens and is partially in contact with the image-side surface of the sixth lens, and a spacing element P6*b* disposed between the image-side surface of the sixth spacing element P6 and the object-side surface of the seventh lens; and a spacing element P7 (seventh spacing element) that is disposed on the image side of the seventh lens and is partially in contact with the image-side surface of the seventh lens, and a spacing element P7*b* (eighth spacing element) disposed between the image-side surface of the seventh spacing element P7 and the object-side surface of the eighth lens.

In Embodiment 1-2, the values of relevant parameters are as shown in Table 3-2 below. Here, the meaning of the parameters is as above, and thus will not be repeatedly described here. The units of the parameters are millimeters (mm).

TABLE 3-2

| d1s | d1m | D1s | d2s | D2s | d3s | D3s | d4s | D4s | d5s | d5m |
|---|---|---|---|---|---|---|---|---|---|---|
| 2.412 | 2.380 | 3.112 | 2.472 | 3.332 | 2.576 | 4.600 | 2.896 | 5.000 | 3.284 | 3.240 |
| d6s | D6s | EP45 | CP5 | EP56 | CP6 | EP67 | CP7 | d7bs | d7bm | |
| 5.328 | 6.000 | 0.236 | 0.022 | 0.466 | 0.324 | 0.346 | 0.411 | 7.884 | 7.840 | |

For example, as shown in FIG. 2C, according to Embodiment 1-3, the optical imaging lens assembly may further include spacing elements accommodated in the lens barrel 100 and disposed between the lenses, for example, a spacing element P1 (first spacing element) that is disposed on the image side of the first lens and is partially in contact with the image-side surface of the first lens; a spacing element P2 that is disposed on the image side of the second lens and is partially in contact with the image-side surface of the second lens; a spacing element P3 that is disposed on the image side of the third lens and is partially in contact with the image-side surface of the third lens; a spacing element P4 that is disposed on the image side of the fourth lens and is partially in contact with the image-side surface of the fourth lens; a spacing element P5 that is disposed on the image side of the fifth lens and is partially in contact with the image-side surface of the fifth lens; a spacing element P6 (sixth spacing element) that is disposed on the image side of the sixth lens and is partially in contact with the image-side surface of the sixth lens, and a spacing element P6*b* disposed between the image-side surface of the sixth spacing element P6 and the object-side surface of the seventh lens; a spacing element P7 (seventh spacing element) that is disposed on the image side of the seventh lens and is partially in contact with the image-side surface of the seventh lens, and a spacing element P7*b* (eighth spacing element) disposed between the image-side surface of the seventh spacing element P7 and the object-side surface of the eighth lens; and a spacing element P8 that is disposed on the image side of the eighth lens and is partially in contact with the image-side surface of the eighth lens.

In Embodiment 1-3, the values of relevant parameters are as shown in Table 3-3 below. Here, the meaning of the parameters is as above, and thus will not be repeatedly described here. The units of the parameters are millimeters (mm).

TABLE 3-3

| d1s | d1m | D1s | d2s | D2s | d3s | D3s | d4s | D4s | d5s | d5m |
|---|---|---|---|---|---|---|---|---|---|---|
| 2.436 | 2.380 | 3.112 | 2.496 | 3.332 | 2.602 | 4.600 | 2.922 | 5.000 | 3.316 | 3.240 |

TABLE 3-3-continued

| d6s | D6s | EP45 | CP5 | EP56 | CP6 | EP67 | CP7 | d7bs | d7bm |
|---|---|---|---|---|---|---|---|---|---|
| 5.328 | 6.000 | 0.236 | 0.022 | 0.466 | 0.324 | 0.346 | 0.411 | 7.916 | 7.840 |

Figure 3A:
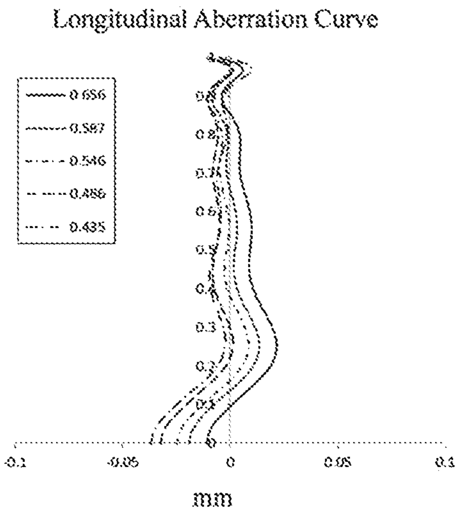
FIGS. 3A-3D respectively illustrate a longitudinal aberration curve, an astigmatic curve, a distortion curve and a lateral color curve of the optical imaging lens assembly in Embodiment 1.
Figure 3B:
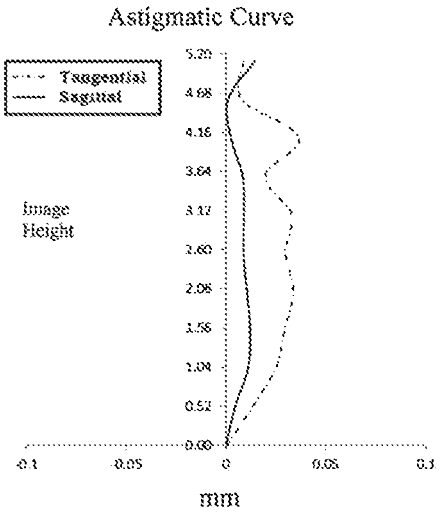
Figure 3C:
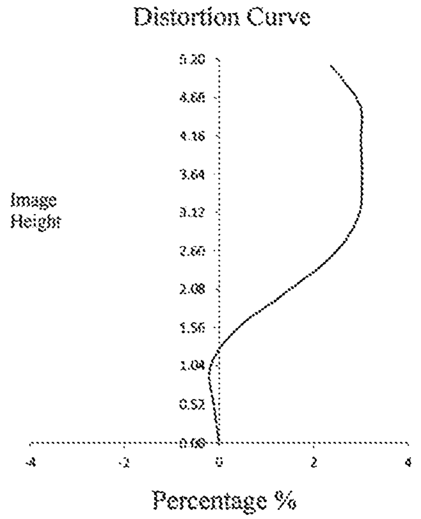
Figure 3D:
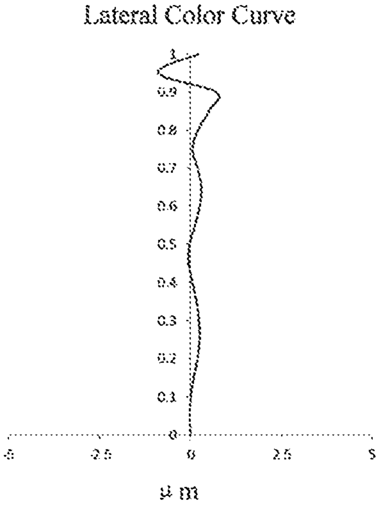

FIG. 3A illustrates a longitudinal aberration curve of the optical imaging lens assembly according to Embodiment 1, representing deviations of focal points converged by light of different wavelengths after passing through the lens assembly. FIG. 3B illustrates an astigmatic curve of the optical imaging lens assembly according to Embodiment 1, representing a curvature of a tangential image plane and a curvature of a sagittal image plane. FIG. 3C illustrates a distortion curve of the optical imaging lens assembly according to Embodiment 1, representing amounts of distortion corresponding to different image heights. FIG. 3D illustrates a lateral color curve of the optical imaging lens assembly according to Embodiment 1, representing deviations of different image heights on the image plane after light passes through the lens assembly. It can be seen from FIGS. 3A-3D that the optical imaging lens assembly given in Embodiment 1 can achieve a good imaging quality.

Embodiment 2

Figure 4A:
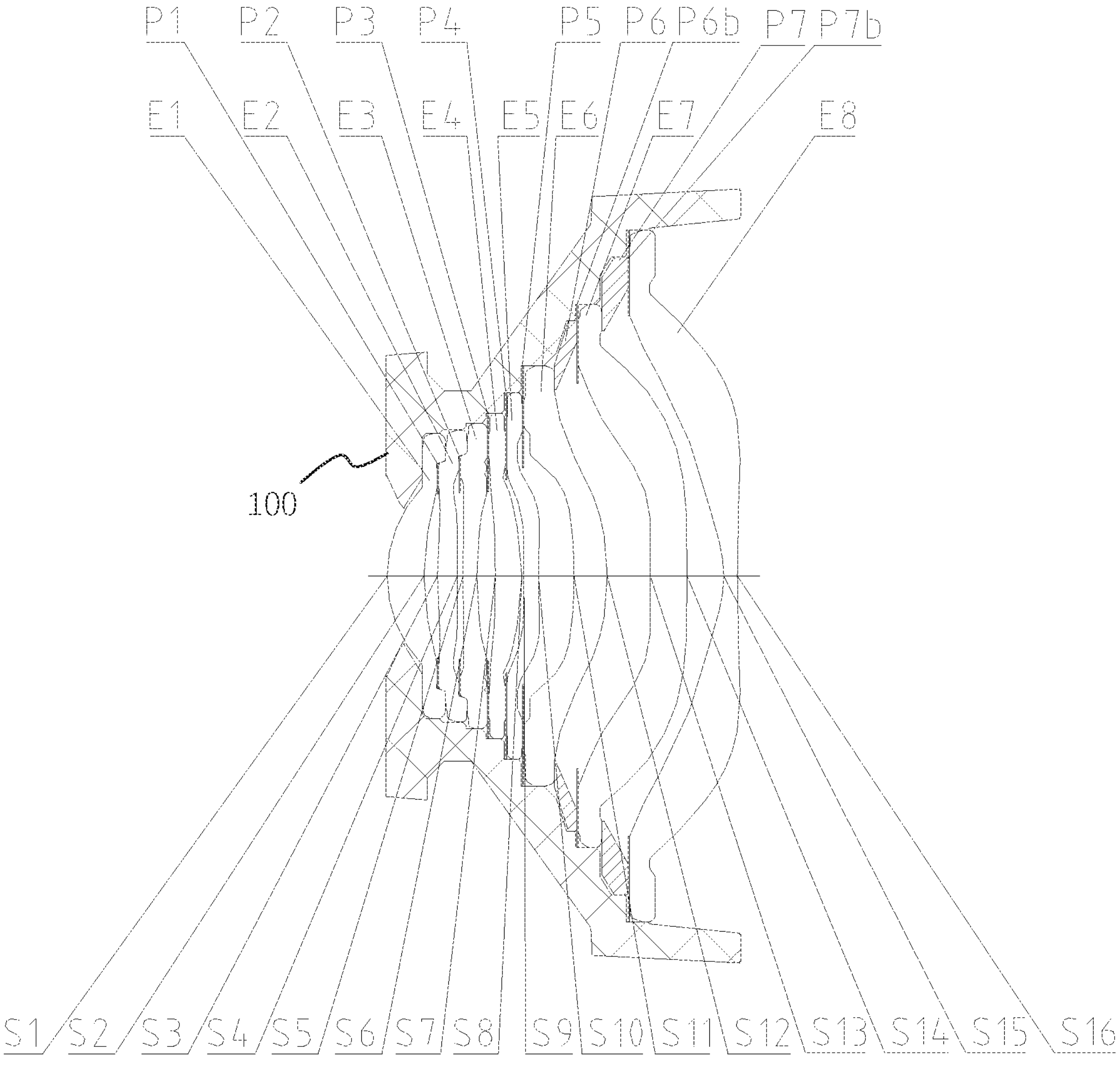
FIGS. 4A-4C are schematic structural diagrams of an optical imaging lens assembly in three implementations according to Embodiment 2 of the present disclosure.
Figure 4B:
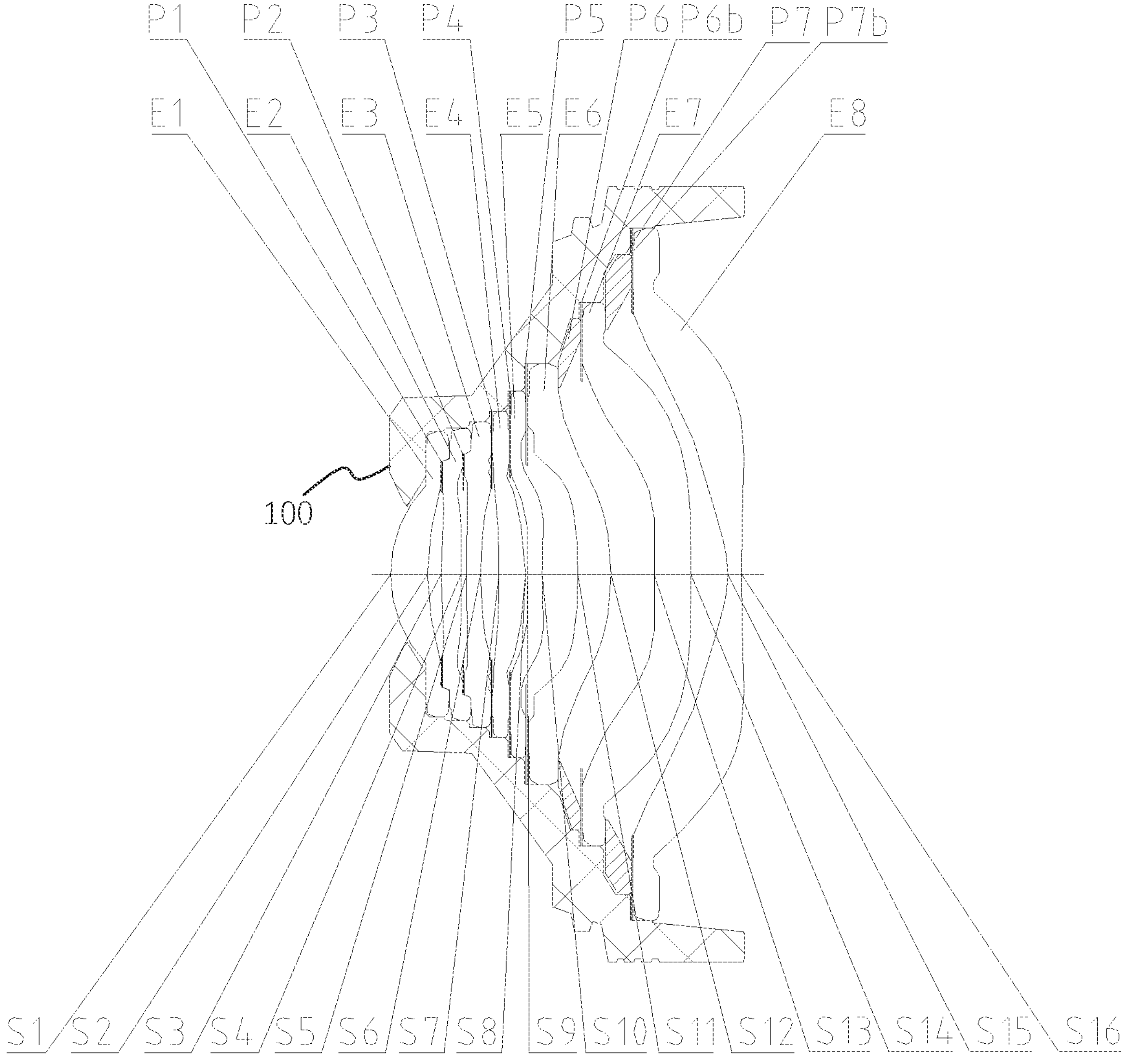
Figure 4C:
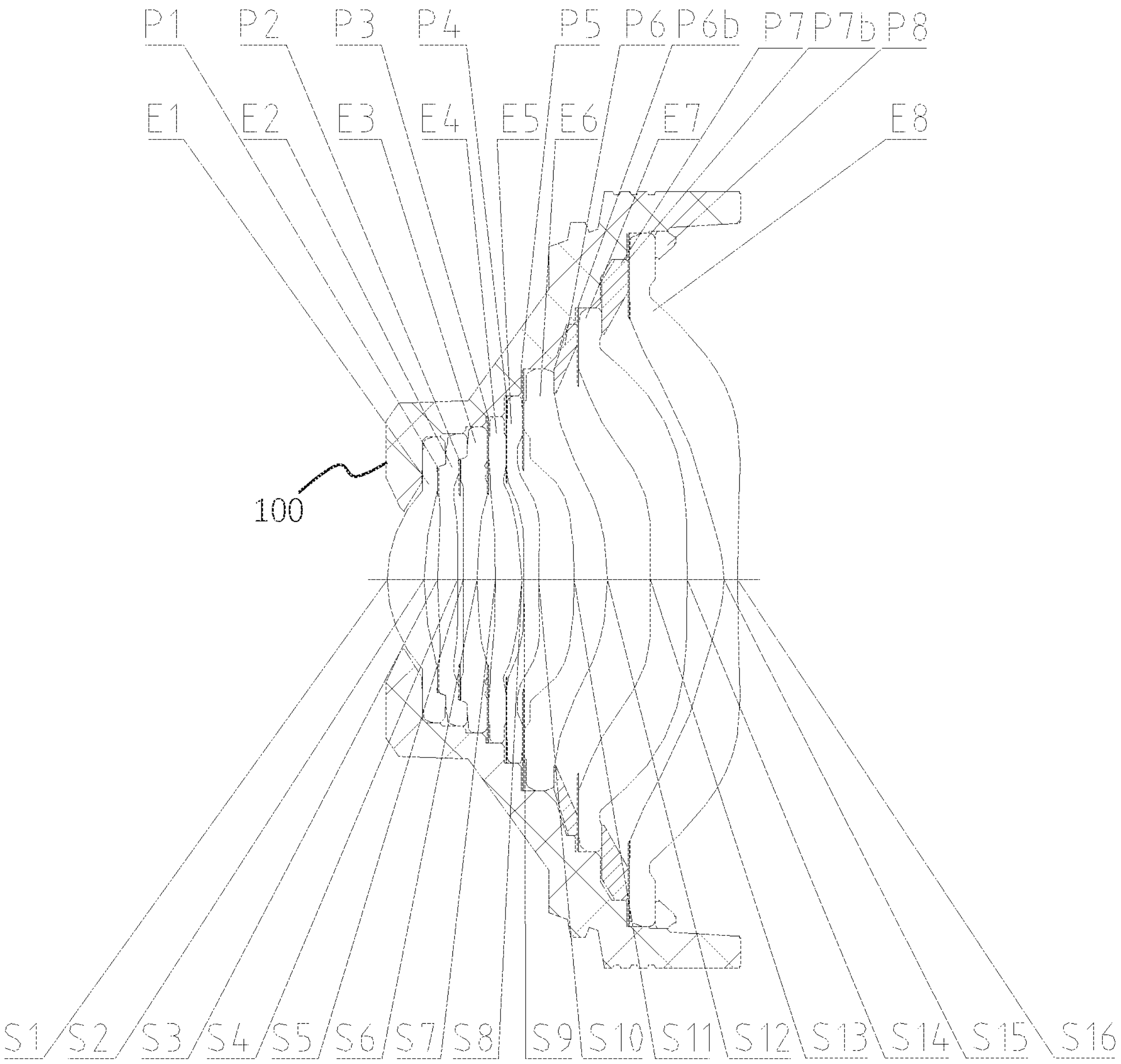

An optical imaging lens assembly according to Embodiment 2 of the present disclosure is described below with reference to FIGS. 4A-4C and FIGS. 5A-5D. In this embodiment and the following embodiment, for the sake of brevity, some descriptions similar to those in Embodiment 1 will be omitted. FIGS. 4A-4C are schematic structural diagrams of the optical imaging lens assembly in three different implementations according to Embodiment 2 of the present disclosure.

As shown in FIGS. 4A-4C, the optical imaging lens assembly includes a lens barrel 100, and a first lens E1, a second lens E2, a third lens E3, a fourth lens E4, a fifth lens E5, a sixth lens E6, a seventh lens E7 and an eighth lens E8 that are accommodated in the lens barrel 100 and arranged in sequence along an optical axis from an object side to an image side.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a concave surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a concave surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a concave surface, and an image-side surface S16 of the eighth lens E8 is a convex surface. The optical imaging lens assembly may further include an optical filter E9 (not shown), and the optical filter E9 may have an object-side surface S17 and an image-side surface S18. The optical imaging lens assembly may further include an image plane S19 (not shown). Light from an object may sequentially pass through the surfaces S1-S18, and finally forms an image on the image plane S19.

Table 4 shows basic parameters of the optical imaging lens assembly in Embodiment 2. Here, the units of a radius of curvature and a thickness/distance are millimeters (mm). Tables 5-1 and 5-2 show the high-order coefficients $A_4$, $A_6$, $A_8$, $A_{10}$, $A_{12}$, $A_{14}$, $A_{16}$, $A_{18}$, $A_{20}$, $A_{22}$ and $A_{24}$ applicable to the aspheric surfaces S1-S16 in Embodiment 2. Here, the surface type of each aspheric surface may be defined using the formula (1) given in Embodiment 1.

TABLE 4

| | | | | material | | |
|---|---|---|---|---|---|---|
| surface number | surface type | radius of curvature | thickness/distance | refractive index | abbe number | conic coefficient |
| OBJ | spherical | infinite | infinite | | | |
| STO | spherical | | −0.4657 | | | |
| S1 | aspheric | 1.9492 | 0.5391 | 1.54 | 56.0 | 0.0668 |
| S2 | aspheric | 3.8183 | 0.1981 | | | 0.2781 |
| S3 | aspheric | 6.2495 | 0.2921 | 1.54 | 56.0 | −1.7454 |
| S4 | aspheric | 20.2803 | 0.0854 | | | −2.0446 |
| S5 | aspheric | 10.4681 | 0.2000 | 1.68 | 19.2 | −0.7504 |
| S6 | aspheric | 5.4797 | 0.2711 | | | 2.6067 |
| S7 | aspheric | −11.0869 | 0.3893 | 1.54 | 56.0 | 26.3287 |
| S8 | aspheric | −3.1577 | 0.0300 | | | 0.0037 |
| S9 | aspheric | 9.0668 | 0.2127 | 1.68 | 19.2 | 6.7594 |
| S10 | aspheric | 3.8700 | 0.5211 | | | −2.3170 |
| S11 | aspheric | −13.3289 | 0.4887 | 1.67 | 19.7 | 7.8966 |
| S12 | aspheric | −4.2148 | 0.6298 | | | −1.0062 |
| S13 | aspheric | 10.8058 | 0.5396 | 1.57 | 35.4 | 0.3147 |
| S14 | aspheric | −93.8955 | 0.5381 | | | −99.0000 |
| S15 | aspheric | −1.7424 | 0.2000 | 1.62 | 24.4 | −1.0141 |

TABLE 4-continued

| surface number | surface type | radius of curvature | thickness/distance | material: refractive index | material: abbe number | conic coefficient |
|---|---|---|---|---|---|---|
| S16 | aspheric | −200.0000 | 0.0300 | | | −99.0000 |
| S17 | spherical | infinite | 0.1100 | 1.52 | 64.2 | |
| S18 | spherical | infinite | 0.5048 | | | |
| S19 | spherical | infinite | | | | |

TABLE 5-1

| surface number | A4 | A6 | A8 | A10 | A12 | A14 |
|---|---|---|---|---|---|---|
| S1 | 3.8153E−04 | 1.2862E−03 | 2.7814E−04 | 8.3449E−05 | −3.4511E−05 | 1.3508E−08 |
| S2 | −2.7648E−02 | 6.5367E−04 | 1.1406E−03 | −7.2056E−05 | −4.2497E−05 | −7.1227E−05 |
| S3 | −8.0605E−02 | 1.1433E−03 | 1.2742E−03 | −3.2191E−04 | −1.6823E−04 | 6.7299E−06 |
| S4 | −9.8020E−02 | 3.2452E−03 | 9.6383E−04 | −8.9618E−04 | 9.3283E−05 | 2.5296E−06 |
| S5 | −8.0487E−02 | 1.0445E−02 | 1.7103E−03 | −6.5346E−04 | 1.4444E−04 | −5.2478E−05 |
| S6 | −1.2193E−02 | 1.5202E−02 | 4.7569E−03 | 5.8212E−04 | 2.4579E−04 | −4.3522E−05 |
| S7 | 3.0662E−02 | −1.8524E−02 | 3.1582E−03 | 4.6297E−04 | 4.7786E−04 | 2.2637E−05 |
| S8 | 1.0226E−01 | −2.4886E−02 | 1.4863E−03 | −3.2393E−03 | −2.1232E−03 | −4.7190E−04 |
| S9 | −3.8444E−01 | 4.7714E−02 | −4.4881E−03 | 2.0940E−04 | −3.8515E−03 | −3.0716E−04 |
| S10 | −6.2603E−01 | 6.3085E−02 | −3.6216E−03 | 8.2839E−03 | −1.4865E−03 | 4.2368E−04 |
| S11 | −4.4623E−01 | −4.4665E−02 | 4.6963E−03 | 9.8601E−03 | 2.3464E−03 | 2.4161E−04 |
| S12 | −1.7248E−01 | 1.0378E−01 | −7.9219E−03 | −6.4788E−03 | −3.8627E−03 | 2.1427E−03 |
| S13 | −1.8303E+00 | 5.4502E−01 | −1.0260E−01 | −1.0025E−02 | 7.6453E−03 | −1.0692E−03 |
| S14 | −1.1701E+00 | 3.6130E−02 | −6.9228E−03 | 4.5070E−03 | 8.8261E−03 | 4.7765E−03 |
| S15 | 3.2750E+00 | −7.7254E−01 | 3.1701E−01 | −1.2346E−01 | 5.3655E−02 | −1.7029E−02 |
| S16 | −1.0661E+00 | −1.4822E−01 | 1.3009E−01 | −4.4941E−02 | 1.3873E−02 | −1.0096E−02 |

TABLE 5-2

| surface number | A16 | A18 | A20 | A22 | A24 |
|---|---|---|---|---|---|
| S1 | −1.7393E−05 | 9.4454E−06 | 2.7797E−06 | 0.0000E+00 | 0.0000E+00 |
| S2 | −7.9294E−06 | −2.2717E−05 | 7.6206E−06 | 0.0000E+00 | 0.0000E+00 |
| S3 | −8.8793E−06 | 9.5962E−06 | −1.2794E−05 | 0.0000E+00 | 0.0000E+00 |
| S4 | 9.5371E−06 | −1.4672E−07 | 1.2416E−06 | 0.0000E+00 | 0.0000E+00 |
| S5 | 1.3362E−06 | 2.0831E−05 | 4.2164E−07 | 0.0000E+00 | 0.0000E+00 |
| S6 | −3.5174E−06 | 9.0159E−06 | 1.0233E−06 | 0.0000E+00 | 0.0000E+00 |
| S7 | 2.0476E−05 | −1.7557E−05 | −1.4253E−06 | 0.0000E+00 | 0.0000E+00 |
| S8 | −1.9179E−04 | 4.0569E−05 | −2.7075E−06 | 0.0000E+00 | 0.0000E+00 |
| S9 | −3.3762E−04 | 6.9072E−05 | −2.6839E−05 | 0.0000E+00 | 0.0000E+00 |
| S10 | −4.0122E−04 | −1.9857E−05 | −5.6297E−05 | 0.0000E+00 | 0.0000E+00 |
| S11 | −1.4452E−04 | −1.2200E−04 | −9.0051E−05 | 0.0000E+00 | 0.0000E+00 |
| S12 | 1.0803E−03 | −3.6267E−04 | −2.2431E−04 | 7.2718E−05 | 0.0000E+00 |
| S13 | 5.4963E−04 | −1.0729E−03 | 3.3539E−04 | 2.7006E−04 | −1.6655E−04 |
| S14 | 2.4085E−04 | −1.7912E−03 | −7.8268E−04 | −5.3199E−04 | 1.4265E−04 |
| S15 | 7.5689E−04 | −7.9454E−05 | −3.2288E−06 | 4.2004E−05 | 2.6945E−05 |
| S16 | 2.5073E−03 | 3.3103E−04 | 1.5586E−04 | 3.9712E−04 | −4.9517E−04 |

For example, as shown in FIG. 4A, according to Embodiment 2-1, the optical imaging lens assembly may further include spacing elements accommodated in the lens barrel 100 and disposed between the lenses, for example, a spacing element P1 (first spacing element) that is disposed on the image side of the first lens and is partially in contact with the image-side surface of the first lens; a spacing element P2 that is disposed on the image side of the second lens and is partially in contact with the image-side surface of the second lens; a spacing element P3 that is disposed on the image side of the third lens and is partially in contact with the image-side surface of the third lens; a spacing element P4 that is disposed on the image side of the fourth lens and is partially in contact with the image-side surface of the fourth lens; a spacing element P5 that is disposed on the image side of the fifth lens and is partially in contact with the image-side surface of the fifth lens; a spacing element P6 (sixth spacing element) that is disposed on the image side of the sixth lens and is partially in contact with the image-side surface of the sixth lens, and a spacing element P6*b* disposed between the image-side surface of the sixth spacing element P6 and the object-side surface of the seventh lens; and a spacing element P7 (seventh spacing element) that is disposed on the image side of the seventh lens and is partially in contact with the image-side surface of the seventh lens, and a spacing element P7*b* (eighth spacing element) disposed between the image-side surface of the seventh spacing element P7 and the object-side surface of the eighth lens.

In Embodiment 2-1, the values of relevant parameters are as shown in Table 6-1 below. Here, the meaning of the parameters is as above, and thus will not be repeatedly described here. The units of the parameters are millimeters (mm).

TABLE 6-1

| d1s | d1m | D1s | d2s | D2s | d3s | D3s | d4s | D4s | d5s | d5m |
|---|---|---|---|---|---|---|---|---|---|---|
| 2.420 | 2.420 | 3.312 | 2.460 | 3.532 | 2.500 | 4.800 | 2.840 | 5.400 | 3.200 | 3.200 |
| d6s | D6s | EP45 | CP5 | EP56 | CP6 | EP67 | CP7 | d7bs | d7bm | |
| 5.528 | 6.196 | 0.227 | 0.022 | 0.444 | 0.334 | 0.362 | 0.387 | 7.680 | 7.680 | |

For example, as shown in FIG. 4B, according to Embodiment 2-2, the optical imaging lens assembly may further include spacing elements accommodated in the lens barrel 100 and disposed between the lenses, for example, a spacing element P1 (first spacing element) that is disposed on the image side of the first lens and is partially in contact with the image-side surface of the first lens; a spacing element P2 that is disposed on the image side of the second lens and is partially in contact with the image-side surface of the second lens; a spacing element P3 that is disposed on the image side of the third lens and is partially in contact with the image-side surface of the third lens; a spacing element P4 that is disposed on the image side of the fourth lens and is partially in contact with the image-side surface of the fourth lens; a spacing element P5 that is disposed on the image side of the fifth lens and is partially in contact with the image-side surface of the fifth lens; a spacing element P6 (sixth spacing element) that is disposed on the image side of the sixth lens and is partially in contact with the image-side surface of the sixth lens, and a spacing element P6*b* disposed between the image-side surface of the sixth spacing element P6 and the object-side surface of the seventh lens; and a spacing element P7 (seventh spacing element) that is disposed on the image side of the seventh lens and is partially in contact with the image-side surface of the seventh lens, and a spacing element P7*b* (eighth spacing element) disposed between the image-side surface of the seventh spacing element P7 and the object-side surface of the eighth lens.

In Embodiment 2-2, the values of relevant parameters are as shown in Table 6-2 below. Here, the meaning of the parameters is as above, and thus will not be repeatedly described here. The units of the parameters are millimeters (mm).

TABLE 6-2

| d1s | d1m | D1s | d2s | D2s | d3s | D3s | d4s | D4s | d5s | d5m |
|---|---|---|---|---|---|---|---|---|---|---|
| 2.452 | 2.420 | 3.312 | 2.492 | 3.532 | 2.532 | 4.800 | 2.872 | 5.400 | 3.244 | 3.200 |
| d6s | D6s | EP45 | CP5 | EP56 | CP6 | EP67 | CP7 | d7bs | d7bm | |
| 5.528 | 6.196 | 0.227 | 0.022 | 0.444 | 0.334 | 0.362 | 0.387 | 7.712 | 7.680 | |

For example, as shown in FIG. 4C, according to Embodiment 2-3, the optical imaging lens assembly may further include spacing elements accommodated in the lens barrel 100 and disposed between the lenses, for example, a spacing element P1 (first spacing element) that is disposed on the image side of the first lens and is partially in contact with the image-side surface of the first lens; a spacing element P2 that is disposed on the image side of the second lens and is partially in contact with the image-side surface of the second lens; a spacing element P3 that is disposed on the image side of the third lens and is partially in contact with the image-side surface of the third lens; a spacing element P4 that is disposed on the image side of the fourth lens and is partially in contact with the image-side surface of the fourth lens; a spacing element P5 that is disposed on the image side of the fifth lens and is partially in contact with the image-side surface of the fifth lens; a spacing element P6 (sixth spacing element) that is disposed on the image side of the sixth lens and is partially in contact with the image-side surface of the sixth lens, and a spacing element P6*b* disposed between the image-side surface of the sixth spacing element P6 and the object-side surface of the seventh lens; a spacing element P7 (seventh spacing element) that is disposed on the image side of the seventh lens and is partially in contact with the image-side surface of the seventh lens, and a spacing element P7*b* (eighth spacing element) disposed between the image-side surface of the seventh spacing element P7 and the object-side surface of the eighth lens; and a spacing element P8 that is disposed on the image side of the eighth lens and is partially in contact with the image-side surface of the eighth lens.

In Embodiment 2-3, the values of relevant parameters are as shown in Table 6-3 below. Here, the meaning of the parameters is as above, and thus will not be repeatedly described here. The units of the parameters are millimeters (mm).

TABLE 6-3

| d1s | d1m | D1s | d2s | D2s | d3s | D3s | d4s | D4s | d5s | d5m |
|---|---|---|---|---|---|---|---|---|---|---|
| 2.476 | 2.420 | 3.312 | 2.516 | 3.532 | 2.556 | 4.800 | 2.896 | 5.400 | 3.276 | 3.200 |
| d6s | D6s | EP45 | CP5 | EP56 | CP6 | EP67 | CP7 | d7bs | d7bm | |
| 5.528 | 6.196 | 0.227 | 0.022 | 0.444 | 0.334 | 0.362 | 0.387 | 7.736 | 7.680 | |

Figure 5A:
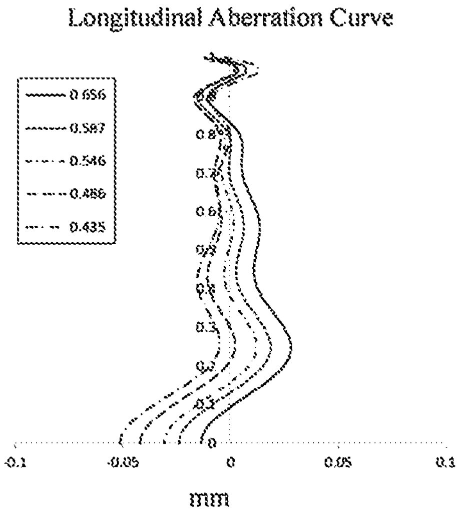
FIGS. 5A-5D respectively illustrate a longitudinal aberration curve, an astigmatic curve, a distortion curve and a lateral color curve of the optical imaging lens assembly in Embodiment 2.
Figure 5B:
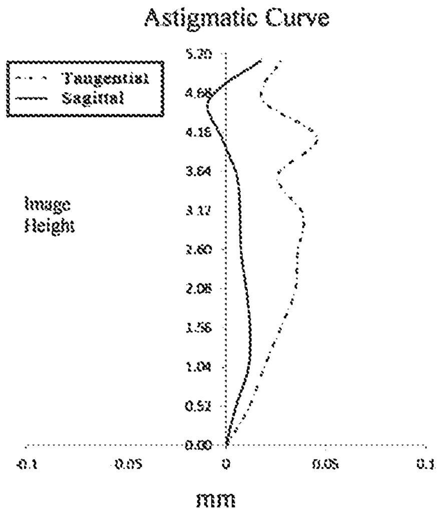
Figure 5C:
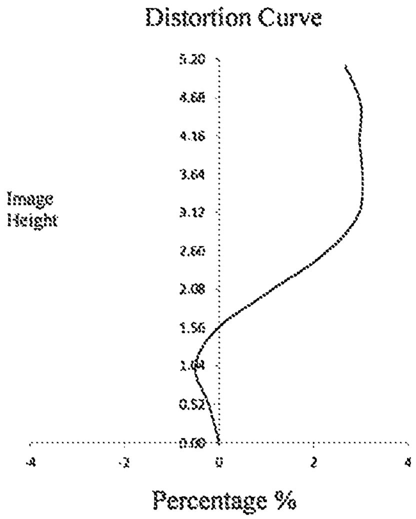
Figure 5D:
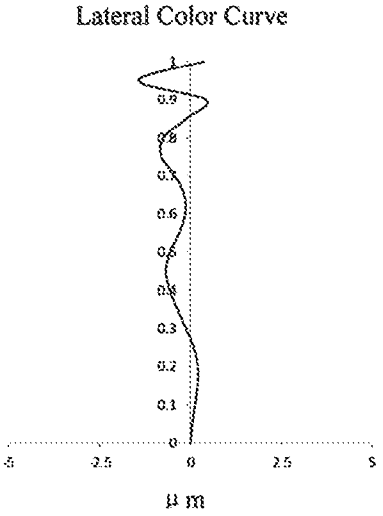

FIG. 5A illustrates a longitudinal aberration curve of the optical imaging lens assembly according to Embodiment 2, representing deviations of focal points converged by light of different wavelengths after passing through the lens assembly. FIG. 5B illustrates an astigmatic curve of the optical imaging lens assembly according to Embodiment 2, representing a curvature of a tangential image plane and a curvature of a sagittal image plane. FIG. 5C illustrates a distortion curve of the optical imaging lens assembly according to Embodiment 2, representing amounts of distortion corresponding to different image heights. FIG. 5D illustrates a lateral color curve of the optical imaging lens assembly according to Embodiment 2, representing deviations of different image heights on the image plane after light passes through the lens assembly. It can be seen from FIGS. 5A-5D that the optical imaging lens assembly given in Embodiment 2 can achieve a good imaging quality.

Embodiment 3

Figure 6A:
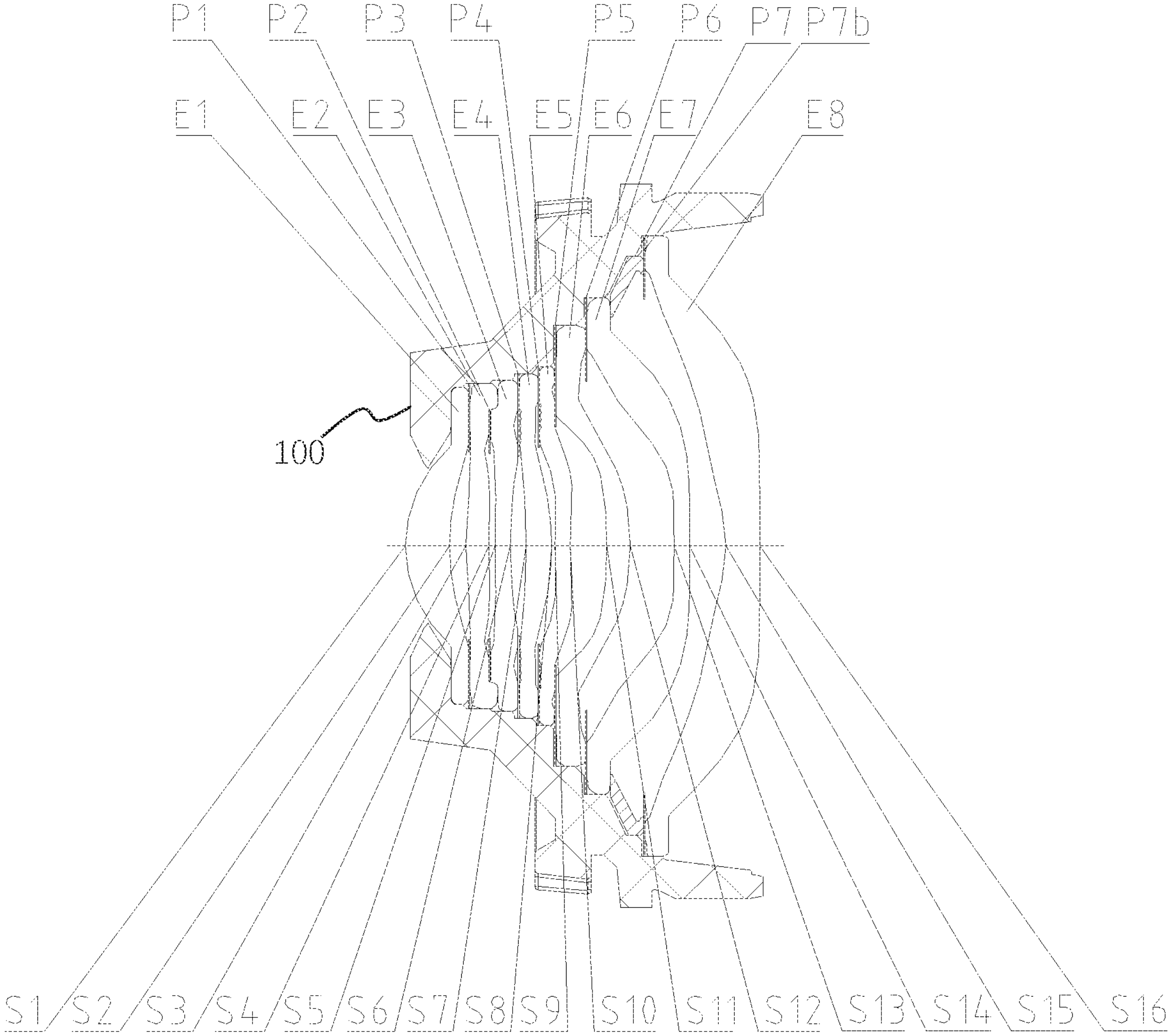
FIGS. 6A-6C are schematic structural diagrams of an optical imaging lens assembly in three implementations according to Embodiment 3 of the present disclosure.
Figure 6B:
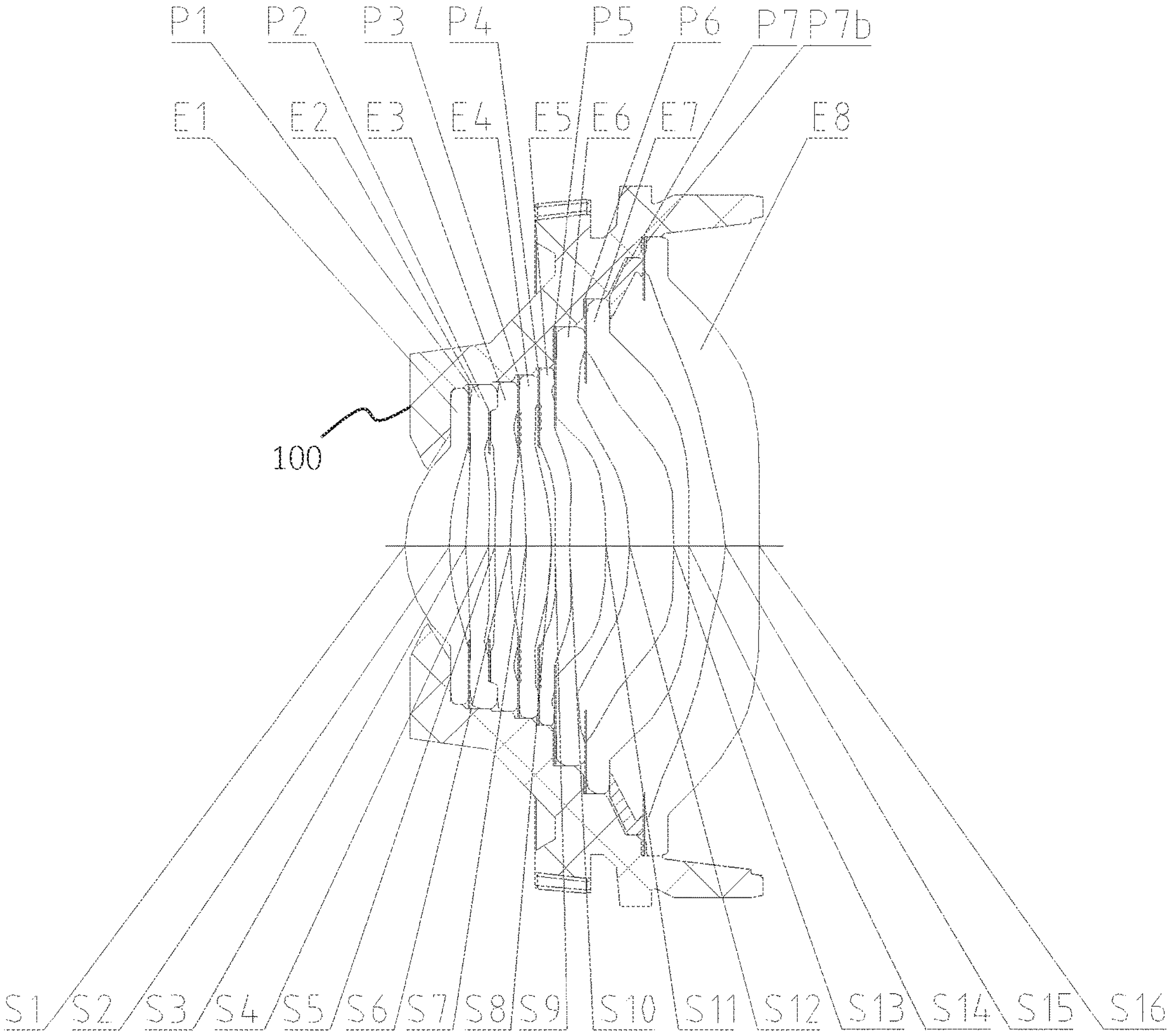
Figure 6C:
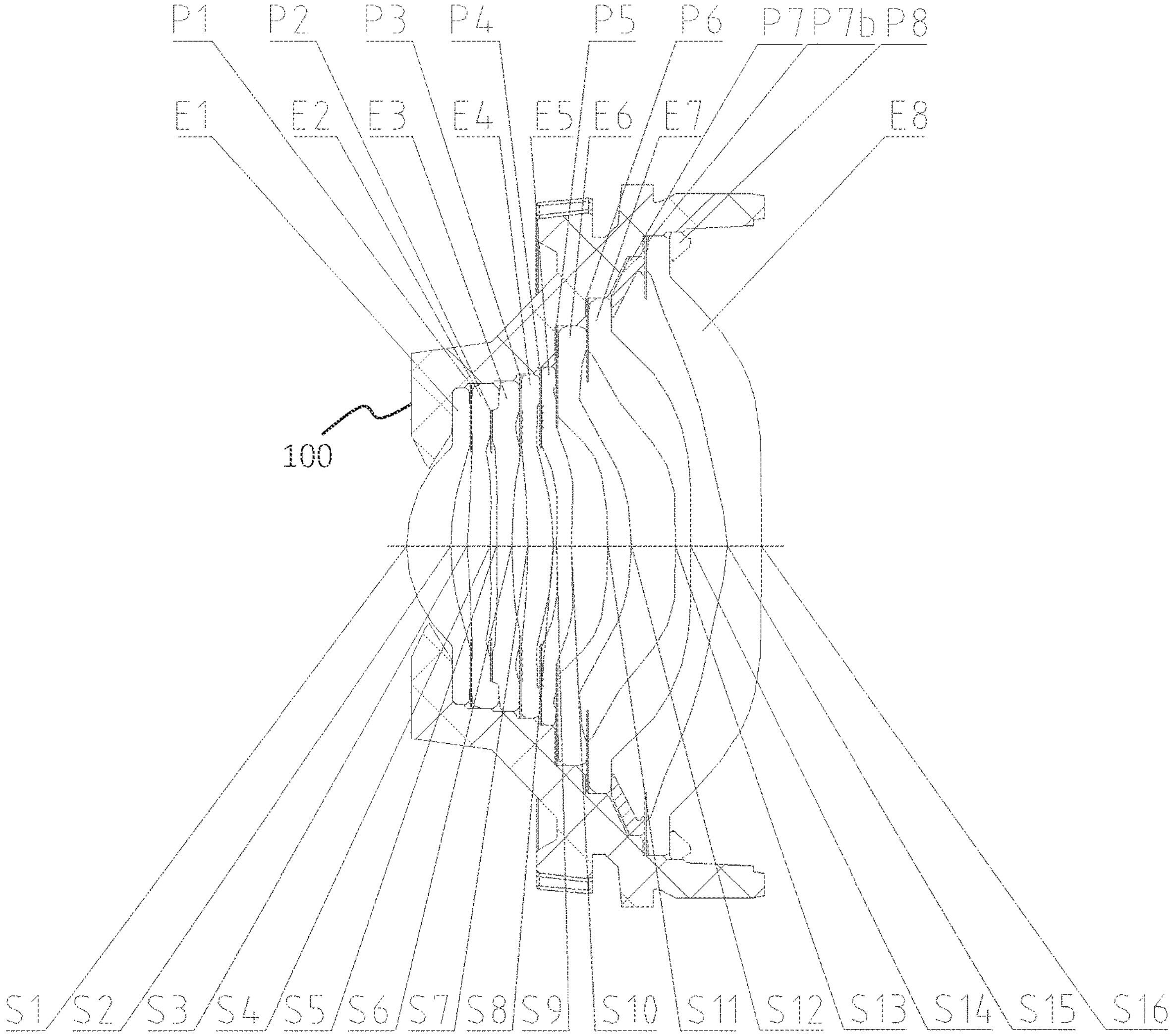

An optical imaging lens assembly according to Embodiment 3 of the present disclosure is described below with reference to FIGS. 6A-6C and FIGS. 7A-7D. FIGS. 6A-6C are schematic structural diagrams of the optical imaging lens assembly in three different implementations according to Embodiment 3 of the present disclosure.

As shown in FIGS. 6A-6C, the optical imaging lens assembly includes a lens barrel 100, and a first lens E1, a second lens E2, a third lens E3, a fourth lens E4, a fifth lens E5, a sixth lens E6, a seventh lens E7 and an eighth lens E8 that are accommodated in the lens barrel 100 and arranged in sequence along an optical axis from an object side to an image side.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a concave surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a concave surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a concave surface. The eighth lens E8 has a negative refractive power, an object-side surface S15 of the eighth lens E8 is a concave surface, and an image-side surface S16 of the eighth lens E8 is a convex surface. The optical imaging lens assembly may further include an optical filter E9 (not shown), and the optical filter E9 may have an object-side surface S17 and an image-side surface S18. The optical imaging lens assembly may further include an image plane S19 (not shown). Light from an object may sequentially pass through the surfaces S1-S18, and finally forms an image on the image plane S19.

Table 7 shows basic parameters of the optical imaging lens assembly in Embodiment 3. Here, the units of a radius of curvature and a thickness/distance are millimeters (mm). Tables 8-1 and 8-2 show the high-order coefficients $A_4$, $A_6$, $A_8$, $A_{10}$, $A_{12}$, $A_{14}$, $A_{16}$, $A_{18}$, $A_{20}$, $A_{22}$ and $A_{24}$ applicable to the aspheric surfaces S1-S16 in Embodiment 3. Here, the surface type of each aspheric surface may be defined using the formula (1) given in Embodiment 1.

TABLE 7

| | | | | material | | |
|---|---|---|---|---|---|---|
| surface number | surface type | radius of curvature | thickness/distance | refractive index | abbe number | conic coefficient |
| OBJ | spherical | infinite | infinite | | | |
| STO | spherical | | −0.5500 | | | |
| S1 | aspheric | 1.9004 | 0.6369 | 1.54 | 56.0 | 0.0000 |
| S2 | aspheric | 3.4137 | 0.2359 | | | 0.0000 |
| S3 | aspheric | 5.0396 | 0.3311 | 1.54 | 56.0 | 0.0000 |
| S4 | aspheric | 11.3517 | 0.0907 | | | 0.0000 |
| S5 | aspheric | 11.5985 | 0.2200 | 1.67 | 19.0 | 0.0000 |
| S6 | aspheric | 6.6114 | 0.2302 | | | 0.0000 |
| S7 | aspheric | −7.2088 | 0.3680 | 1.54 | 56.0 | 0.0000 |

TABLE 7-continued

| surface number | surface type | radius of curvature | thickness/distance | material refractive index | material abbe number | conic coefficient |
|---|---|---|---|---|---|---|
| S8 | aspheric | −3.2113 | 0.0475 | | | 0.0000 |
| S9 | aspheric | 6.1938 | 0.2200 | 1.67 | 19.0 | 0.0000 |
| S10 | aspheric | 3.5165 | 0.5255 | | | 0.0000 |
| S11 | aspheric | −11.1644 | 0.3411 | 1.67 | 19.0 | 0.0000 |
| S12 | aspheric | −4.0330 | 0.6334 | | | 0.0000 |
| S13 | aspheric | 11.5176 | 0.2209 | 1.58 | 32.2 | 0.0000 |
| S14 | aspheric | 30.0686 | 0.5279 | | | 0.0000 |
| S15 | aspheric | −1.9340 | 0.4870 | 1.65 | 20.9 | −1.0000 |
| S16 | aspheric | −111.5368 | 0.0491 | | | 0.0000 |
| S17 | spherical | infinite | 0.1100 | 1.52 | 64.2 | |
| S18 | spherical | infinite | 0.5050 | | | |
| S19 | spherical | infinite | | | | |

TABLE 8-1

| surface number | A4 | A6 | A8 | A10 | A12 | A14 |
|---|---|---|---|---|---|---|
| S1 | −8.0599E−03 | −3.0781E−03 | −7.1634E−04 | −3.3708E−04 | −2.3839E−05 | −6.7653E−05 |
| S2 | −4.6499E−02 | −2.9306E−03 | 1.7799E−03 | 5.4224E−04 | −1.5646E−05 | 2.0897E−05 |
| S3 | −1.1323E−01 | −7.0305E−04 | 3.8367E−03 | −3.6518E−04 | −3.4813E−04 | −2.1989E−05 |
| S4 | −1.1894E−01 | 4.5660E−03 | 1.6817E−03 | −1.6797E−03 | −1.7785E−04 | 8.0061E−05 |
| S5 | −8.0597E−02 | 1.1330E−02 | 1.6049E−03 | −1.1130E−03 | 6.2037E−05 | 5.4435E−07 |
| S6 | −1.9560E−02 | 8.7252E−03 | 2.9283E−03 | 1.5772E−04 | 1.2797E−04 | 2.4210E−05 |
| S7 | 4.4304E−02 | −1.8042E−02 | 3.8938E−03 | 3.0272E−04 | 2.4935E−04 | −8.8608E−05 |
| S8 | 9.8808E−02 | −1.8786E−02 | 5.5336E−03 | −7.1087E−04 | 5.2550E−05 | −1.4499E−04 |
| S9 | −4.2171E−01 | 4.8018E−02 | −4.1232E−03 | −2.0919E−03 | −1.5720E−03 | −2.3125E−04 |
| S10 | −7.1452E−01 | 1.0684E−01 | −3.9923E−03 | 6.9011E−04 | −3.5628E−03 | 1.6108E−05 |
| S11 | −4.9908E−01 | −2.3521E−02 | 1.4008E−02 | 7.2369E−03 | 6.1814E−04 | −2.1482E−05 |
| S12 | −2.1278E−01 | 9.6036E−02 | −2.4350E−02 | −9.7532E−03 | −6.7824E−04 | 2.3645E−03 |
| S13 | −1.8987E+00 | 5.8484E−01 | −1.2586E−01 | −6.1979E−03 | 8.6682E−03 | −6.9563E−04 |
| S14 | −1.2895E+00 | 8.3489E−02 | −2.7071E−02 | 6.7780E−03 | 4.4299E−03 | 5.7661E−03 |
| S15 | 3.1236E+00 | −7.7152E−01 | 3.0447E−01 | −1.1935E−01 | 5.1118E−02 | −1.4054E−02 |
| S16 | −1.2970E+00 | −8.3960E−03 | 7.5083E−02 | −2.1351E−02 | 7.1867E−03 | −3.7784E−03 |

TABLE 8-2

| surface number | A16 | A18 | A20 | A22 | A24 |
|---|---|---|---|---|---|
| S1 | 5.9754E−06 | 0.0000E+00 | 0.0000E+00 | 0.0000E+00 | 0.0000E+00 |
| S2 | −1.2632E−05 | 0.0000E+00 | 0.0000E+00 | 0.0000E+00 | 0.0000E+00 |
| S3 | 5.7823E−05 | 6.5570E−08 | 0.0000E+00 | 0.0000E+00 | 0.0000E+00 |
| S4 | 4.7049E−05 | 3.6312E−08 | 0.0000E+00 | 0.0000E+00 | 0.0000E+00 |
| S5 | −1.0012E−05 | 0.0000E+00 | 0.0000E+00 | 0.0000E+00 | 0.0000E+00 |
| S6 | −1.3343E−05 | −5.8836E−08 | 0.0000E+00 | 0.0000E+00 | 0.0000E+00 |
| S7 | 5.8468E−06 | 0.0000E+00 | 0.0000E+00 | 0.0000E+00 | 0.0000E+00 |
| S8 | 2.2548E−04 | 2.8077E−06 | 0.0000E+00 | 0.0000E+00 | 0.0000E+00 |
| S9 | 4.9191E−04 | 6.1832E−06 | 1.1636E−07 | 0.0000E+00 | 0.0000E+00 |
| S10 | 3.4366E−04 | 2.7515E−06 | 0.0000E+00 | 0.0000E+00 | 0.0000E+00 |
| S11 | −2.3905E−04 | −1.5870E−05 | −1.4941E−06 | 0.0000E+00 | 0.0000E+00 |
| S12 | −4.7051E−04 | −2.6099E−05 | −2.4188E−06 | −2.4186E−07 | 0.0000E+00 |
| S13 | −7.8138E−04 | −6.6641E−05 | −8.4612E−06 | −1.1859E−06 | −1.5569E−07 |
| S14 | 1.6033E−04 | 2.2466E−05 | 2.3982E−06 | 0.0000E+00 | 0.0000E+00 |
| S15 | 1.0632E−03 | 3.0843E−05 | 1.5635E−06 | 8.9417E−08 | 0.0000E+00 |
| S16 | 9.7298E−04 | 5.2317E−05 | 4.5362E−06 | 4.2270E−07 | 0.0000E+00 |

For example, as shown in FIG. 6A, according to Embodiment 3-1, the optical imaging lens assembly may further include spacing elements accommodated in the lens barrel 100 and disposed between the lenses, for example, a spacing element P1 (first spacing element) that is disposed on the image side of the first lens and is partially in contact with the image-side surface of the first lens; a spacing element P2 that is disposed on the image side of the second lens and is partially in contact with the image-side surface of the second lens; a spacing element P3 that is disposed on the image side of the third lens and is partially in contact with the image-side surface of the third lens; a spacing element P4 that is disposed on the image side of the fourth lens and is partially in contact with the image-side surface of the fourth lens; a spacing element P5 that is disposed on the image side of the fifth lens and is partially in contact with the image-side surface of the fifth lens; a spacing element P6 that is disposed on the image side of the sixth lens and is partially in contact with the image-side surface of the sixth lens; and a spacing element P7 (seventh spacing element) that is disposed on the image side of the seventh lens and is partially in contact with the image-side surface of the seventh lens, and a spacing element P7*b* (eighth spacing element) disposed between the image-side surface of the seventh spacing element P7 and the object-side surface of the eighth lens.

In Embodiment 3-1, the values of relevant parameters are as shown in Table 9-1 below. Here, the meaning of the parameters is as above, and thus will not be repeatedly described here. The units of the parameters are millimeters (mm).

TABLE 9-1

| d1s | d1m | D1s | d2s | D2s | d3s | D3s | d4s | D4s | d5s | d5m |
|---|---|---|---|---|---|---|---|---|---|---|
| 2.720 | 2.720 | 4.720 | 2.680 | 3.928 | 2.600 | 5.000 | 2.860 | 5.200 | 3.460 | 3.460 |
| d6s | D6s | EP45 | CP5 | EP56 | CP6 | EP67 | CP7 | d7bs | d7bm | |
| 4.760 | 7.200 | 0.222 | 0.018 | 0.425 | 0.018 | 0.340 | 0.483 | 7.160 | 7.160 | |

For example, as shown in FIG. 6B, according to Embodiment 3-2, the optical imaging lens assembly may further include spacing elements accommodated in the lens barrel 100 and disposed between the lenses, for example, a spacing element P1 (first spacing element) that is disposed on the image side of the first lens and is partially in contact with the image-side surface of the first lens; a spacing element P2 that is disposed on the image side of the second lens and is partially in contact with the image-side surface of the second lens; a spacing element P3 that is disposed on the image side of the third lens and is partially in contact with the image-side surface of the third lens; a spacing element P4 that is disposed on the image side of the fourth lens and is partially in contact with the image-side surface of the fourth lens; a spacing element P5 that is disposed on the image side of the fifth lens and is partially in contact with the image-side surface of the fifth lens; a spacing element P6 that is disposed on the image side of the sixth lens and is partially in contact with the image-side surface of the sixth lens; and a spacing element P7 (seventh spacing element) that is disposed on the image side of the seventh lens and is partially in contact with the image-side surface of the seventh lens, and a spacing element P7*b* (eighth spacing element) disposed between the image-side surface of the seventh spacing element P7 and the object-side surface of the eighth lens.

In Embodiment 3-2, the values of relevant parameters are as shown in Table 9-2 below. Here, the meaning of the parameters is as above, and thus will not be repeatedly described here. The units of the parameters are millimeters (mm).

TABLE 9-2

| d1s | d1m | D1s | d2s | D2s | d3s | D3s | d4s | D4s | d5s | d5m |
|---|---|---|---|---|---|---|---|---|---|---|
| 2.756 | 2.720 | 4.720 | 2.716 | 3.928 | 2.636 | 5.000 | 2.896 | 5.200 | 3.496 | 3.460 |
| d6s | D6s | EP45 | CP5 | EP56 | CP6 | EP67 | CP7 | d7bs | d7bm | |
| 4.796 | 7.200 | 0.222 | 0.018 | 0.425 | 0.018 | 0.340 | 0.483 | 7.196 | 7.160 | |

For example, as shown in FIG. 6C, according to Embodiment 3-3, the optical imaging lens assembly may further include spacing elements accommodated in the lens barrel 100 and disposed between the lenses, for example, a spacing element P1 (first spacing element) that is disposed on the image side of the first lens and is partially in contact with the image-side surface of the first lens; a spacing element P2 that is disposed on the image side of the second lens and is partially in contact with the image-side surface of the second lens; a spacing element P3 that is disposed on the image side of the third lens and is partially in contact with the image-side surface of the third lens; a spacing element P4 that is disposed on the image side of the fourth lens and is partially in contact with the image-side surface of the fourth lens; a spacing element P5 that is disposed on the image side of the fifth lens and is partially in contact with the image-side surface of the fifth lens; a spacing element P6 that is disposed on the image side of the sixth lens and is partially in contact with the image-side surface of the sixth lens; a spacing element P7 (seventh spacing element) that is disposed on the image side of the seventh lens and is partially in contact with the image-side surface of the seventh lens, and a spacing element P7*b* (eighth spacing element) disposed between the image-side surface of the seventh spacing element P7 and the object-side surface of the eighth lens; and a spacing element P8 that is disposed on the image side of the eighth lens and is partially in contact with the image-side surface of the eighth lens.

In Embodiment 3-3, the values of relevant parameters are as shown in Table 9-3 below. Here, the meaning of the parameters is as above, and thus will not be repeatedly described here. The units of the parameters are millimeters (mm).

TABLE 9-3

| d1s | d1m | D1s | d2s | D2s | d3s | D3s | d4s | D4s | d5s | d5m |
|---|---|---|---|---|---|---|---|---|---|---|
| 2.782 | 2.720 | 4.720 | 2.756 | 3.928 | 2.662 | 5.000 | 2.922 | 5.200 | 3.522 | 3.460 |
| d6s | D6s | EP45 | CP5 | EP56 | CP6 | EP67 | CP7 | d7bs | d7bm | |
| 4.822 | 7.200 | 0.222 | 0.018 | 0.425 | 0.018 | 0.340 | 0.483 | 7.222 | 7.160 | |

Figure 7A:
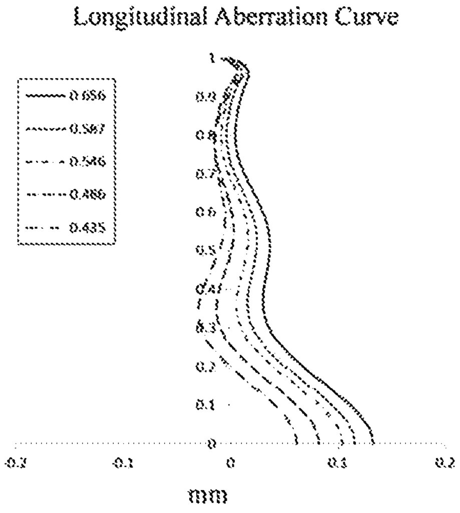
FIGS. 7A-7D respectively illustrate a longitudinal aberration curve, an astigmatic curve, a distortion curve and a lateral color curve of the optical imaging lens assembly in Embodiment 3.
Figure 7B:
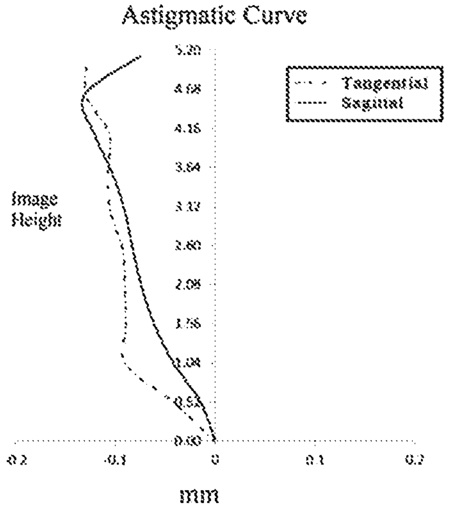
Figure 7C:
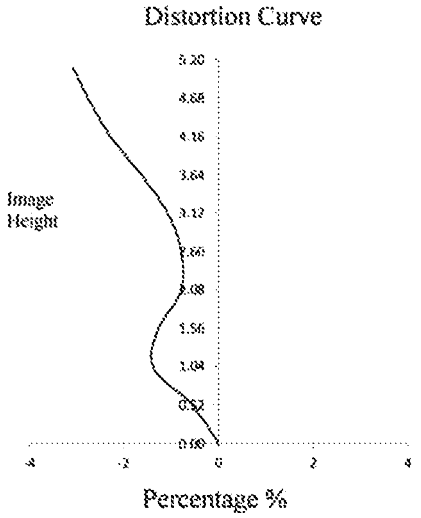
Figure 7D:
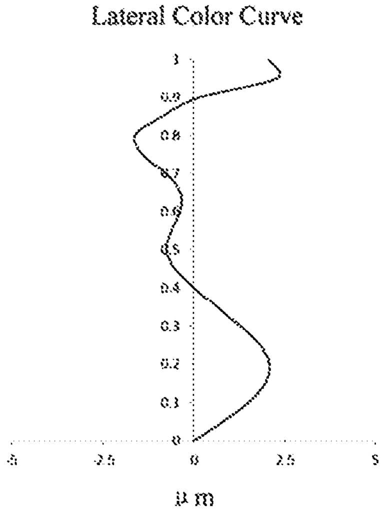

FIG. 7A illustrates a longitudinal aberration curve of the optical imaging lens assembly according to Embodiment 3, representing deviations of focal points converged by light of different wavelengths after passing through the lens assembly. FIG. 7B illustrates an astigmatic curve of the optical imaging lens assembly according to Embodiment 3, representing a curvature of a tangential image plane and a curvature of a sagittal image plane. FIG. 7C illustrates a distortion curve of the optical imaging lens assembly according to Embodiment 3, representing amounts of distortion corresponding to different image heights. FIG. 7D illustrates a lateral color curve of the optical imaging lens assembly according to Embodiment 3, representing deviations of different image heights on the image plane after light passes through the lens assembly. It can be seen from FIGS. 7A-7D that the optical imaging lens assembly given in Embodiment 3 can achieve a good imaging quality.

In addition, in Embodiments 1-3, the effective focal length values f1-f8 of the lenses, the effective focal length f of the optical imaging lens assembly, the distance TTL from the object-side surface of the first lens to the image plane of the optical imaging lens assembly along the optical axis and the half of the maximal field-of-view Semi-FOV of the optical imaging lens assembly are as shown in Table 10.

TABLE 10

| parameter/embodiment | 1 | 2 | 3 |
|---|---|---|---|
| f1(mm) | 6.09 | 6.61 | 6.82 |
| f2(mm) | 14.51 | 16.39 | 16.27 |
| f3(mm) | −11.62 | −17.06 | −23.08 |
| f4(mm) | 9.01 | 7.93 | 10.25 |
| f5(mm) | −11.31 | −10.02 | −12.41 |
| f6(mm) | 8.14 | 8.89 | 9.13 |
| f7(mm) | 14.62 | 16.92 | 31.97 |
| f8(mm) | −2.83 | −2.80 | −3.00 |
| f(mm) | 4.74 | 4.81 | 5.43 |
| TTL(mm) | 5.78 | 5.78 | 5.78 |
| Semi-FOV(°) | 46.3 | 45.8 | 44.5 |

Embodiments 1-3 satisfy the conditions shown in Table 11.

TABLE 11

| conditional expression/embodiment | | 1-1 | 1-2 | 1-3 | 2-1 | 2-2 | 2-3 | 3-1 | 3-2 | 3-3 |
|---|---|---|---|---|---|---|---|---|---|---|
| (R9 × R10)/(d5s × d5m) | | 2.68 | 2.64 | 2.62 | 3.43 | 3.38 | 3.35 | 1.82 | 1.80 | 1.79 |
| (R1 + R2)/(R2 − R1) × (d1s/d1m) | | 2.63 | 2.66 | 2.69 | 3.09 | 3.13 | 3.16 | 3.51 | 3.56 | 3.59 |
| Rim/CTi + Dis/dis | i = 1 | 9.27 | 9.25 | 9.24 | 8.45 | 8.43 | 8.42 | 7.10 | 7.07 | 7.06 |
| (i = 1,2,3,4) | i = 2 | −73.14 | −73.15 | −73.17 | 70.87 | 70.85 | 70.84 | 35.76 | 35.74 | 35.71 |
| | i = 3 | 43.27 | 43.25 | 43.23 | 29.32 | 29.29 | 29.28 | 31.97 | 31.95 | 31.93 |
| | i = 4 | 6.76 | −6.78 | −6.80 | −6.21 | −6.23 | −6.25 | −6.91 | −6.93 | −6.95 |
| EP(j − 1)/CPj + T(j − 1)/CTj | j = 5 | 10.88 | 10.88 | 10.88 | 10.46 | 10.46 | 10.46 | 12.55 | 12.55 | 12.55 |
| (j = 5,6,7) | j = 6 | 2.64 | 2.64 | 2.64 | 2.40 | 2.40 | 2.40 | 25.15 | 25.15 | 25.15 |
| | j = 7 | 1.91 | 1.91 | 1.91 | 2.10 | 2.10 | 2.10 | 3.57 | 3.57 | 3.57 |
| (R16 − R15)/f8 × (d7bs/d7bm) | | 70.06 | 70.45 | 70.74 | 70.77 | 71.06 | 71.28 | 36.52 | 36.70 | 36.83 |
| (D6s + d6s)/EP67 + T67/CT6 | | 33.90 | 33.90 | 33.90 | 33.68 | 33.68 | 33.68 | 37.03 | 37.14 | 37.22 |
| EP12/CP1 + CT1/T12 | | 21.13 | 21.13 | 21.13 | 21.60 | 21.60 | 21.60 | 18.92 | 18.14 | 18.92 |
| (T56 + CT6)/(EP56 + CP6) × (R11/f6) | | −31.85 | −31.85 | −31.85 | −1.95 | −1.95 | −1.95 | −2.39 | −2.39 | −2.39 |
| (d0m+D0m)/L + TD/f | | 5.22 | 5.22 | 5.21 | 5.29 | 5.29 | 5.28 | 4.81 | 4.811 | 4.80 |

The present disclosure further provides an imaging apparatus provided with an electronic photosensitive element to form images, and the electronic photosensitive element may be a photosensitive charge-coupled device (CCD) or complementary metal-oxide semiconductor element (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description for the preferred embodiments of the present disclosure and the applied technical principles. It should be appreciated by those skilled in the art that the scope of protection of the present disclosure is not limited to the technical solution formed by the particular combination of the above technical features. The scope should also cover other technical solutions formed by any combination of the above technical features or equivalent features thereof without departing from the concept of the present disclosure, such as, technical solutions formed by replacing the features disclosed in the present disclosure with (but not limited to) technical features with similar functions.

What is claimed is:

1. An optical imaging lens assembly, comprising: a lens barrel, and a lens group and at least seven spacing elements accommodated in the lens barrel, wherein the lens group comprises a first lens having a positive refractive power, a second lens having a positive refractive power, a third lens having a negative refractive power, a fourth lens having a positive refractive power, a fifth lens having a negative refractive power, a sixth lens having a positive refractive power, a seventh lens having a positive refractive power and an eighth lens having a negative refractive power that are arranged in sequence along an optical axis from an object side to an image side, wherein at least one lens in the first lens to the fourth lens is a meniscus lens; and a distance from a center of an effective-diameter portion of an object-side surface of the eighth lens to a rear-end surface of the lens barrel along the optical axis is less than a distance from an edge of the effective-diameter portion of the object-side surface of the eighth lens to the rear-end surface of the lens barrel along the optical axis;

the at least seven spacing elements comprise a fifth spacing element that is disposed on an image side of the fifth lens and is partially in contact with the fifth lens, and at least one spacing element disposed between the seventh lens and the eighth lens; and the optical imaging lens assembly satisfies:

$$(R9\times R10)/(d5s\times d5m)>0.5,$$

wherein R9 is a radius of curvature of an object-side surface of the fifth lens, R10 is a radius of curvature of an image-side surface of the fifth lens, d5s is an inner diameter of an object-side surface of the fifth spacing element, and d5m is an inner diameter of an image-side surface of the fifth spacing element.

2. The optical imaging lens assembly according to claim 1, wherein the at least seven spacing elements comprise a first spacing element that is disposed on an image side of the first lens and is partially in contact with the first lens.

3. The optical imaging lens assembly according to claim 2, wherein a radius of curvature R1 of an object-side surface of the first lens, a radius of curvature R2 of an image-side surface of the first lens, an inner diameter d1s of an object-side surface of the first spacing element and an inner diameter d1m of an image-side surface of the first spacing element satisfy:

$$(R1+R2)/(R2-R1)\times(d1s/d1m)>1.0.$$

4. The optical imaging lens assembly according to claim 1, wherein an object-side surface of the first lens is a convex surface, and an image-side surface of the first lens is a concave surface; and an object-side surface of the second lens is a convex surface.

5. The optical imaging lens assembly according to claim 1, wherein the at least seven spacing elements comprise an i-th spacing element that is disposed on an image side of an i-th lens and is partially in contact with the i-th lens, and the optical imaging lens assembly satisfies:

$$-100.0<Rim/CTi+Dis/dis<100.0,$$

wherein Rim is a radius of curvature of an image-side surface of the i-th lens, CTi is a center thickness of the i-th lens on the optical axis, Dis is an outer diameter of an object-side surface of the i-th spacing element, and dis is an inner diameter of the object-side surface of the i-th spacing element, wherein i is selected from 1, 2, 3 or 4.

6. The optical imaging lens assembly according to claim 1, wherein the object-side surface of the fifth lens is a convex surface, and the image-side surface of the fifth lens is a concave surface.

7. The optical imaging lens assembly according to claim 1, wherein the object-side surface of the eighth lens is a concave surface.

8. The optical imaging lens assembly according to claim 1, wherein the at least seven spacing elements comprise a j-th spacing element that is disposed on an image side of a j-th lens and is partially in contact with the j-th lens, and a (j−1)-th spacing element that is disposed on an image side of a (j−1)-th lens and is partially in contact with the (j−1)-th lens, and the optical imaging lens assembly satisfies:

$$EP(j-1)/CPj+T(j-1)/CTj>0.5,$$

wherein Ep(j−1) is a spacing distance between the (j−1)-th spacing element and the j-th spacing element along the optical axis, CPj is a maximal thickness of the j-th spacing element, T(j−1) is an air spacing between the (j−1)-th lens and the j-th lens on the optical axis, and CTj is a center thickness of the j-th lens on the optical axis, wherein j is selected from 5, 6 or 7.

9. The optical imaging lens assembly according to claim 8, satisfying:

$$1.0<EP(j-1)/CPj+T(j-1)/CTj<20.0.$$

10. The optical imaging lens assembly according to claim 1, wherein the at least one spacing element disposed between the seventh lens and the eighth lens comprises:

a seventh spacing element that is disposed on an image side of the seventh lens and is partially in contact with the seventh lens, and an eighth spacing element that is disposed on an image side of the seventh spacing element.

11. The optical imaging lens assembly according to claim 10, wherein a radius of curvature R16 of an image-side surface of the eighth lens, a radius of curvature R15 of the object-side surface of the eighth lens, an effective focal length f8 of the eighth lens, an inner diameter d7bs of an object-side surface of the eighth spacing element and an inner diameter d7bm of an image-side surface of the eighth spacing element satisfy:

$$(R16-R15)/f8\times(d7bs/d7bm)>15.0.$$

12. The optical imaging lens assembly according to claim 11, satisfying:

$$20.0<(R16-R15)/f8\times(d7bs/d7bm)<80.0.$$

13. The optical imaging lens assembly according to claim 1, wherein an outer diameter Dos of an object-side surface of a sixth spacing element that is disposed on an image side of the sixth lens and is partially in contact with an image-side surface of the sixth lens, an inner diameter dos of the object-side surface of the sixth spacing element that is disposed on the image side of the sixth lens and is partially in contact with the image-side surface of the sixth lens, a spacing distance EP67 between the sixth spacing element that is disposed on the image side of the sixth lens and is partially in contact with the image-side surface of the sixth lens and the seventh spacing element that is disposed on the image side of the seventh lens and is partially in contact with an image-side surface of the seventh lens along the optical axis, an air spacing T67 between the sixth lens and the seventh lens on the optical axis and a center thickness CT6 of the sixth lens on the optical axis satisfy:

$$(D6s+d6s)/EP67+T67/CT6>20.0.$$

14. The optical imaging lens assembly according to claim 2, wherein a spacing distance EP12 between the first spacing element and a second spacing element that is disposed on an image side of the second lens and is partially in contact with an image-side surface of the second lens along the optical axis, a maximal thickness CP1 of the first spacing element, a center thickness CT1 of the first lens on the optical axis and an air spacing T12 between the first lens and the second lens on the optical axis satisfy:

$$EP12/CP1+CT1/T12>10.0.$$

15. The optical imaging lens assembly according to claim 1, wherein an air spacing T56 between the fifth lens and the sixth lens on the optical axis, a center thickness CT6 of the sixth lens on the optical axis, a spacing distance EP56 between the fifth spacing element that is disposed on the image side of the fifth lens and is partially in contact with the image-side surface of the fifth lens and a sixth spacing element that is disposed on an image side of the sixth lens and is partially in contact with an image-side surface of the sixth lens along the optical axis, a maximal thickness CP6 of the sixth spacing element that is disposed on the image side of the sixth lens and is partially in contact with the image-side surface of the sixth lens, a radius of curvature R11 of an object-side surface of the sixth lens and an effective focal length f6 of the sixth lens satisfy:

$$(T56+CT6)/(EP56+CP6)\times(R11/f6)<0.$$

16. The optical imaging lens assembly according to claim 1, wherein an inner diameter d0m of an end surface of the lens barrel closest to the image side, an outer diameter D0m of the end surface of the lens barrel closest to the image side, a distance L from an end surface closest to a photographed object to the end surface of the lens barrel closest to the image side, a distance TD from the object-side surface of the first lens to the image-side surface of the eighth lens along the optical axis and an effective focal length f of the optical imaging lens assembly satisfy:

$$(d0m+D0m)/L+TD/f>2.0.$$

17. The optical imaging lens assembly according to claim 1, wherein the at least seven spacing elements comprise a flat-angle spacing element or a chamfer spacing element, and an inner hole of the chamfer spacing element has a chamfer within a range from 45° to 60° on an object-side surface or image-side surface of the chamfer spacing element.

18. The optical imaging lens assembly according to claim 6, wherein the at least seven spacing elements comprise a j-th spacing element that is disposed on an image side of a j-th lens and is partially in contact with the j-th lens, and a (j−1)-th spacing element that is disposed on an image side of a (j−1)-th lens and is partially in contact with the (j−1)-th lens, and the optical imaging lens assembly satisfies:

$$EP(j-1)/CPj+T(j-1)/CTj>0.5,$$

wherein Ep(j−1) is a spacing distance between the (j−1)-th spacing element and the j-th spacing element along the optical axis, CPj is a maximal thickness of the j-th spacing element, T(j−1) is an air spacing between the (j−1)-th lens and the j-th lens on the optical axis, and CTj is a center thickness of the j-th lens on the optical axis, wherein j is selected from 5, 6 or 7.

19. The optical imaging lens assembly according to claim 1, wherein the at least seven spacing elements comprise a j-th spacing element that is disposed on an image side of a j-th lens and is partially in contact with the j-th lens, and a (j−1)-th spacing element that is disposed on an image side of a (j−1)-th lens and is partially in contact with the (j−1)-th lens, and the optical imaging lens assembly satisfies:

$$EP(j-1)/CPj+T(j-1)/CTj>0.5,$$

wherein Ep(j−1) is a spacing distance between the (j−1)-th spacing element and the j-th spacing element along the optical axis, CPj is a maximal thickness of the j-th spacing element, T(j−1) is an air spacing between the (j−1)-th lens and the j-th lens on the optical axis, and CTj is a center thickness of the j-th lens on the optical axis, wherein j is selected from 5, 6 or 7.

* * * * *